(12) United States Patent
Christoph et al.

(10) Patent No.: US 10,430,413 B2
(45) Date of Patent: Oct. 1, 2019

(54) DATA INFORMATION FRAMEWORK

(71) Applicant: SAP SE, Walldorf (DE)

(72) Inventors: Bjoern Christoph, Oberhausen-Rheinhausen (DE); Marco Valentin, Malsch (DE); Carsten Pluder, Spiesen-Elversberg (DE); Volker Lehnert, Schriesheim (DE); Johannes Gilbert, Karlsruhe (DE)

(73) Assignee: SAP SE, Walldorf (DE)

( * ) Notice: Subject to any disclaimer, the term of this patent is extended or adjusted under 35 U.S.C. 154(b) by 561 days.

(21) Appl. No.: 15/070,812

(22) Filed: Mar. 15, 2016

(65) Prior Publication Data

US 2017/0270163 A1    Sep. 21, 2017

(51) Int. Cl.
  *G06F 16/2455* (2019.01)
  *G06F 16/248* (2019.01)
  *G06F 16/28* (2019.01)
  *G06F 16/22* (2019.01)

(52) U.S. Cl.
  CPC ...... *G06F 16/2455* (2019.01); *G06F 16/2282* (2019.01); *G06F 16/248* (2019.01); *G06F 16/285* (2019.01)

(58) Field of Classification Search
  CPC ......... G06F 17/30477; G06F 17/30554; G06F 17/30867; G06F 17/30864; G06F 17/30528; G06F 17/30991; G06F 17/30241; G06F 17/30958; G06F 16/2455; G06F 16/285; G06F 16/2282; G06F 16/248
  USPC .................. 707/722, 803, 999.004, 999.102; 711/118
  See application file for complete search history.

(56) References Cited

U.S. PATENT DOCUMENTS

| | | | |
|---|---|---|---|
| 5,615,367 A * | 3/1997 | Bennett | G06F 17/3056 |
| 6,067,548 A | 5/2000 | Cheng | |
| 6,356,897 B1 * | 3/2002 | Gusack | G06F 17/30321 |
| 6,484,180 B1 | 11/2002 | Lyons et al. | |
| 8,090,754 B2 | 1/2012 | Schmidt et al. | |
| 8,438,238 B2 | 5/2013 | Moser et al. | |

(Continued)

OTHER PUBLICATIONS

Publication, "SAP Test Data Migration Server, High-Quality Testing Requires High-Quality Test Data," Sep. 2013.

*Primary Examiner* — Dung K Chau
(74) *Attorney, Agent, or Firm* — Fountainhead Law Group P.C.

(57) ABSTRACT

A data information framework collects related data sharing characteristics (e.g., personal information, others) revealed by associated purpose information, and reports on that data. The location of the data is not restricted, and can be collected from various locations (e.g. different databases on different computer systems). An engine implements data creation defining links between different stored data structures (e.g., tables) using specific fields. A plurality of tables may be grouped into a smaller number of table clusters to facilitate constructing the data model. The model may be evaluated, enhanced, and/or corrected (e.g., by a user). The model may include fields reflecting the purpose information for the stored data, said fields accessible by the engine during data handling processes. The data model may include descriptions providing data storage location. Purpose information may be mapped to table fields. Field descriptions may be based upon purpose information, with some field values having intelligible text.

14 Claims, 28 Drawing Sheets

(56) References Cited

U.S. PATENT DOCUMENTS

| | | | |
|---|---|---|---|
| 2002/0143521 A1* | 10/2002 | Call | G06F 17/2247 704/1 |
| 2003/0121007 A1 | 7/2003 | Schirmer et al. | |
| 2006/0143220 A1 | 6/2006 | Spencer, Jr. | |
| 2011/0138123 A1* | 6/2011 | Gurajada | G06F 17/30595 711/118 |

* cited by examiner

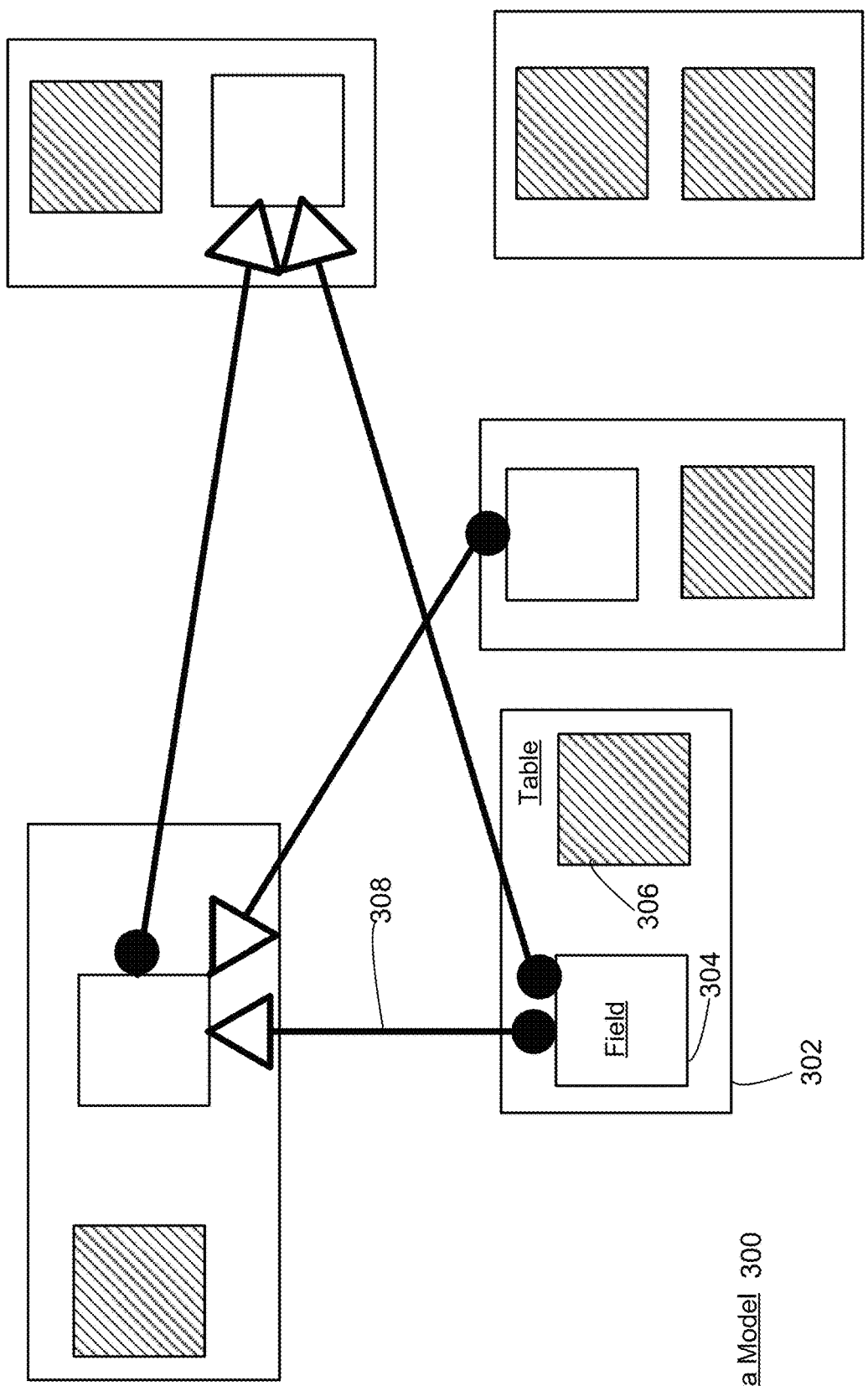

| Table | Short Description | Hits |
|---|---|---|
| LFA1 | Vendor Master (General Section) | 1 |
| EINA | Purchasing Info Record: General Data | 654 |
| EINE | Purchasing Info Record: Purchasing Organization Data | 717 |

FIG. 3H

Table: LFA1

| Vendor | Cty | Name 1 | | | | | Name 2 | | | | | Name 3 | | |
|---|---|---|---|---|---|---|---|---|---|---|---|---|---|---|
| Post. block | | SCAC | CarFrgtG | TranspZone | AltPayeeAc | SAGr | | Tax type | Tax no. ty. | Soc. Ins. | SI Code | | Tax Number 3 | |
| 1000 | DE | C.E.B. BERLIN | | | | | | | | | | | | |

FIG. 3I

Smart Search Column driven

Table: EINA — Purchasing Info Record: General Data

| Info Rec. | Material | Matl Group | Vendor | PPD | Created on | Created by | Info Short Text |
|---|---|---|---|---|---|---|---|
| 5300006446 | | 001 | 1000 | | 29.11.1994 | COPY | PREMD |
| 5300006455 | | 001 | 1000 | | 24.10.1997 | COPY | PP-Preadbearbeitung |
| 5300000237 | | 00216 | 1000 | | 19.04.2013 | CS188816 | Instrumentation |
| 5600000000 | | 001 | 1000 | | 05.11.2010 | FISCHER | Preadfertiger 1000 |
| 5600004401 | | 001 | 1000 | | 05.11.2010 | FISCHER | PREMD |

FIG. 3J

Table: EINE    Purchasing Info Record: Purchasing Organization Data

| Info Rec. | POrg | Cat | PInt P | Created on | Created by | POr | Cccy | VRb R | Minimum Order Qty |
|---|---|---|---|---|---|---|---|---|---|
| 5300006446 | 1 | 0 | 1000 | 29.11.1994 | COPY | 008 | EUR | | 0,000 |
| 5300006446 | 1000 | 0 | 1000 | 12.11.1998 | COPY | 008 | EUR | | 0,000 |
| 5300006455 | 1000 | 0 | 1000 | 24.10.1997 | COPY | 100 | EUR | | 10,000 |
| 5300006576 | 2820 | 0 | 1100 | 25.07.2011 | I037538 | 028 | CNY | | 0,000 |
| 5300006577 | 2820 | 0 | 1100 | 26.07.2011 | I037538 | 028 | CNY | | 0,000 |
| 5300006756 | 1000 | 0 | 1100 | 06.11.2011 | FISCHER | 001 | EUR | | 0,000 |
| 5300006767 | 1000 | 0 | 1100 | 06.11.2011 | FISCHER | 001 | EUR | | 0,000 |
| 5300006826 | 1000 | 0 | 1300 | 28.11.2011 | WETTENGL | 001 | EUR | | 0,000 |
| 5500000237 | 1000 | 0 | 1000 | 19.04.2013 | CS188816 | 100 | USD | | 0,000 |
| 5600000000 | 1000 | 0 | 1000 | 05.11.2010 | FISCHER | 008 | EUR | | 0,000 |
| 5600000000 | 3000 | 0 | 3000 | 05.11.2010 | FISCHER | 008 | USD | | 0,000 |
| 5600004401 | 1000 | 0 | 1000 | 05.11.2010 | FISCHER | 008 | EUR | | 0,000 |
| 5600004401 | 3000 | 0 | 3000 | 05.11.2010 | FISCHER | 008 | USD | | 0,000 |
| 5600004711 | 1000 | 0 | 1000 | 05.11.2010 | FISCHER | 008 | EUR | | 0,000 |
| 5600004711 | 3000 | 3 | 3000 | 05.11.2010 | FISCHER | 008 | USD | | 0,000 |

FIG. 3K

```
<?xml version="1.0" encoding="UTF-8" standalone="yes"?>
<purpose name="Purchasing Records">
<table name="LFA1" field="LIFNR" value="1000">
<entry="Vendor" value="1000">
    <field="Country" value="DE"/>
    <field="Name" value="C.E.B. BERLIN"/>
<table name="EINA">
<entry="Info Rec." value="5300006446">
    <field="Material" value=""/>
    <field="Matl Group" value="001"/>
...
<table name="EINE">
<entry="Info Rec." value="5300006446">
    <field="POrg" value="1"/>
    <field="Cat" value="0"/>
...
    </entry>
    </table>
    </entry>
<entry="Info Rec." value="5300006455">
    <field="Material" value=""/>
    <field="Matl Group" value="001"/>
...
    </entry>
    </table>
    </entry>
</purpose>
```

FIG. 3L

```xml
<?xml version="1.0" encoding="UTF-8" standalone="yes"?>
<purpose name="Purchasing Records">
  <table name="LFA1" field="LIFNR" value="1000">
    <entry="Vendor" value="1000" changed_entry="Vendor Number">
      <field="County" value="DE" changed_value="Deutschland"/>
      <field="Name" value="C.E.B. Berlin"/>
    <table name="EINA">
    <entry="Inf. Rec." value="5300006446" changed_entry="Purchasing Information Record">
      <field="Material" value=""/>
      <field="Matl Group" value="001" changed_field="Material Group"/>
    <table name="EINE">
    <entry="Inf. Rec." value="5300006446" changed_entry="Purchasing Information Record">
      <field="POrg" value="1" changed_field="Puchasing Organization"/>
      <field="Cat" value="0" changed_field="Category"/>
    ...
    </entry>
    </table>
    </entry>
    <entry="Inf. Rec." value="5300006455" changed_entry="Purchasing Information Record">
      <field="Material" value=""/>
      <field="Matl Group" value="001" changed_field="Material Group"/>
    ...
    </entry>
    </table>
    </entry>
</purpose>
```

FIG. 3M

| Purpose | Table Cluster | Table | Field | Conversion Code | Output | Table Description | Field Description |
|---|---|---|---|---|---|---|---|
| Order | Purchasing | EKKN | TXJCD | | Yes | Account Assignment in Purchasing Document | Tax Jurisdiction |
| Order | Purchasing | EKKO | ABGRU | EKKO_ABGGR | Yes | Purchasing Document Header | Reason for Cancellation |
| Order | Purchasing | EKKO | AUSNR | | No | Purchasing Document Header | Bid Invitation number |
| Order | Purchasing | EKKO | AUTLF | | No | Purchasing Document Header | Complete Delivery Stipulated for Each Purchase Order |
| Order | Purchasing | EKKO | BEDAT | | Yes | Purchasing Document Header | Purchasing Document Date |
| Order | Purchasing | EKKO | LOEKZ | | Yes | Purchasing Document Header | Deletion indicator in Purchasing Document |
| Order | Purchasing | EKKO | LOGSY | | No | Purchasing Document Header | Logical System |
| Order | Purchasing | EKPO | ABDAT | | Undefined | Purchasing Document Item | Reconciliation Date for Agreed Cumulative Quantity |
| Order | Purchasing | EKPO | ABELN | | Undefined | Purchasing Document Item | Allocation Table Number |
| Order | Purchasing | EKPO | ABELP | | Undefined | Purchasing Document Item | Item number of allocation table |
| Order | Purchasing | EKPO | ABFTZ | | Undefined | Purchasing Document Item | Agreed Cumulative Quantity |
| Order | Purchasing | EKPO | ABMNG | | Undefined | Purchasing Document Item | Standard release order quantity |
| Order | Purchasing | EKPO | ABSKZ | | Undefined | Purchasing Document Item | Reselection Indicator |

FIG. 4L

DATA INFORMATION FRAMEWORK

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

Unless otherwise indicated herein, the approaches described in this section are not prior art to the claims in this application and are not admitted to be prior art by inclusion in this section.

Embodiments relate to data management, and in particular, to data information frameworks permitting ready identification and retrieval of stored records sharing particular characteristics (e.g., inclusion of personal information; relevance to ongoing legal/regulatory investigation; others).

Data (including personal data) is commonly and accessed by commercial entities and stored within internal data warehouses. Such data warehouses can comprise databases for active files, and may also include separate and distinct archives for less-frequently accessed files.

The laws of various jurisdictions may confer certain rights upon the subject (i.e., the natural or juristical person) with whom the personal data is associated. One such right may be to request, in intelligible form, all personal-related data stored concerning the data subject.

Compliance with the above laws can pose certain challenges for data handling and storage systems. For example, the scope of information representing personal data must be defined, and the location of such stored personal data identified in order to permit access. Finally, the intelligibility of the data once collected, may need to be assured.

SUMMARY

A data information framework is employed to collect related data sharing certain characteristics (e.g., the presence of personal information, relevance to legal/regulatory investigation, others) revealed by associated purpose information, and to report on that data. An engine implements a data creation mode defining links between different stored data structures (e.g., tables) through the use of specific fields. A plurality of different tables may be grouped together into a smaller number of table clusters in order to facilitate constructing the data model. Following creation, the data model may be subject to evaluation, enhancement, and/or correction (for example by a human user). The data model may include fields reflecting the purpose information for the stored data, said fields accessible by the engine during data handling processes. The data model may further include descriptions providing data storage location information. The purpose information may be mapped to table fields. Field descriptions may be based upon purpose information, with some field values having intelligible text. Inter-system links may be defined, thus allowing retrieval of related data in different systems/applications, e.g. follow-on documents.

One embodiment of a computer-implemented method comprises an engine communicating with a database containing a plurality of tables, the engine referencing a first table field to create a data model including links between certain of the plurality of tables. The engine assigns purpose information to the first table field to create a purpose model. The engine receives a query relating to the purpose information. The engine generates a query response by recursively traversing the certain of the plurality of tables to match the purpose information, and the engine delivers the query response for display at an interface.

Certain embodiments further comprise the engine grouping the certain of the plurality of tables into a plurality of table clusters based upon the links.

In some embodiments the engine generates the query response by referencing the purpose information to render the first table field into a text description.

According to particular embodiments the links are defined by function calls between the certain of the plurality of tables.

In various embodiments the links are defined by the certain of the plurality of tables belonging to a database object type.

In certain embodiments the purpose information denotes private data.

According to some embodiments the first table and the second table are part of a first system, and the method further comprises the engine determining a second link between the first table and a third table of a second system.

In various embodiments the database comprises an in-memory database.

In particular embodiments the engine comprises an in-memory database engine.

An embodiment of a computer system comprises an in-memory database engine and a software program, executable on said computer system. The software program is configured to cause the in-memory database engine to communicate with an in-memory database containing a plurality of tables, and to reference a first table field to create a data model including links between certain of the plurality of tables. The software program is further configured to cause the in-memory database to assign purpose information to the first table field to create a purpose model, and to receive a query relating to the purpose information. The software program is further configured to cause the in-memory database to generate a query response by recursively traversing the certain of the plurality of tables to match the purpose information, and to deliver the query response for display at an interface.

Another embodiment of a computer-implemented method comprises an engine communicating with a database containing a plurality of tables, the engine referencing a first table field to create a data model including links between certain of the plurality of tables. The engine assigns purpose information to the first table field to create a purpose model. The engine receives a query relating to the purpose information. The engine generates a query response by recursively traversing the certain of the plurality of tables to match the purpose information, and referencing the purpose information to render the first table field into a text description. The engine delivers the query response for display at an interface.

The following detailed description and accompanying drawings provide a better understanding of the nature and advantages of embodiments.

BRIEF DESCRIPTION OF THE DRAWINGS

FIGS. 4A-L illustrate various aspects of interaction with a data information framework model according to the example.

DETAILED DESCRIPTION

Described herein are methods and apparatuses configured to provide data information frameworks. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

A data information framework is employed to collect related data sharing certain characteristics (e.g., the presence of personal information, relevance to legal/regulatory investigation, others) revealed by associated purpose information, and to report on that data. An engine implements a data creation mode defining links between different stored data structures (e.g., tables) through the use of specific fields. A plurality of different tables may be grouped together into a smaller number of table clusters in order to facilitate constructing the data model. Following creation, the data model may be subject to evaluation, enhancement, and/or correction (for example by a human user). The data model may include fields reflecting the purpose information for the stored data, said fields accessible by the engine during data handling processes. The data model may further include descriptions providing data storage location information. The purpose information may be mapped to table fields. Field descriptions may be based upon purpose information, with some field values having intelligible text. Inter-system links may be defined, thus allowing retrieval of related data in different systems/applications, e.g. follow-on documents.

Figure 1:
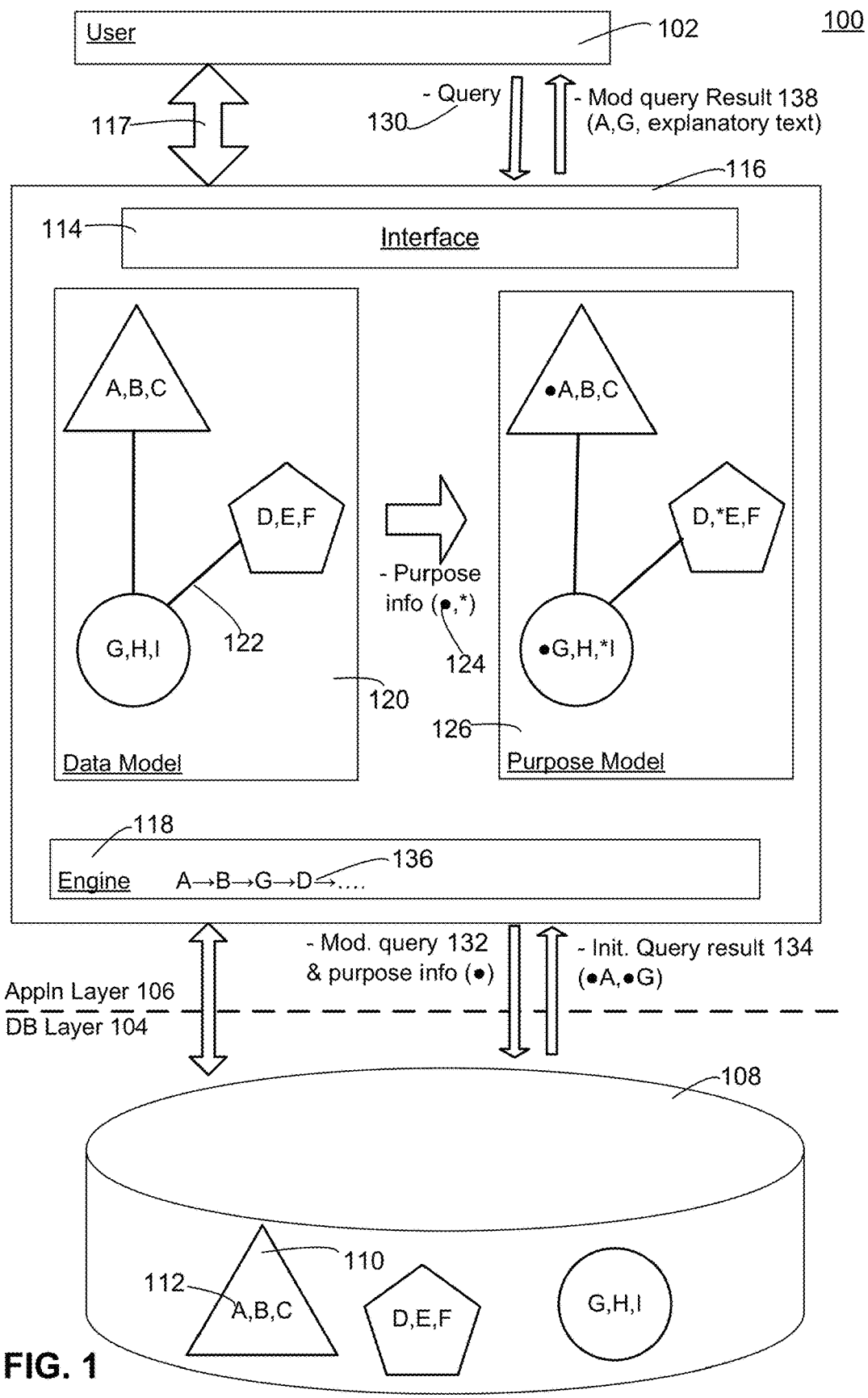
FIG. 1 is a simplified view of a system according to an embodiment.

FIG. 1 presents a simplified view of a system 100 according to an embodiment. In particular, a user 102 is in communication with data stored in an underlying database layer 104, via an intervening application layer 106. Specifically, this database layer comprises a database 108 containing a plurality of different tables 110 comprising data fields 112.

An interface 114 of the application 116 of the application layer, is configure to conduct interaction 117 (receiving inputs, producing outputs) to the user. For example the user may input a query to the interface, requesting the application to retrieve specific query-relevant information from the database.

In order to facilitate the process of data retrieval, the application may include an engine 118. The engine is configured to reference the tables within the database, and generate therefrom a data model 120.

That data model includes not only the various tables, but also links 122 defined between those various tables. As described in detail below, the engine may establish the links of the data model between various tables, based upon one or more considerations. These can include but are not limited to:

fields shared between tables;
function calls (e.g., Remote Function Calls—RFCs) between tables;
table membership in a common type of database data structure—e.g., an Integrated Lifecycle Management (ILM) object utilized by SAP SE systems; and
other existing relationships between tables in the database.

Although not explicitly shown in FIG. 1, the engine may be further configured to group multiple tables into table clusters. This table clustering process is described further below, but it can depend upon relationships between the constituent data fields of different tables, as well as other factors.

The engine is further configured to reference the data model (including fields, tables, links, and table clusters) and assign purpose information 124 to various fields according to a purpose model 126. In certain embodiments, the purpose information can designate a particular property of the table fields.

In one common example discussed below, the purpose information can designate the purpose of the table field as containing personal data of individuals that is susceptible to being requested and provided to data subjects according to national privacy laws. However, the assignment of purpose information is not limited to this particular application, it can designate other properties of stored data.

In addition to serving to indicate specific data properties, purpose information of the purpose model can also perform other functions. In certain embodiments, the purpose information may be referenced to render stored data into a form intelligible to a user.

Thus according to a simple example, a content of a table field may actually comprise a specialized numerical code (e.g., "z921") that is able to be rendered into an intelligible format—e.g., (the text: "the reason for change is z291", is replaced with "the reason for change is request by customer" or this is the "label", e.g., the field z291 now is shown as "the reason for change is request by customer" instead of "z192 request by customer") by the engine also referencing the purpose information. This is also discussed later below.

In certain embodiments, the purpose information may be stored with the table fields in the database. As is discussed below, according to some embodiments, the purpose information may be stored in helper tables generated by the application.

Upon creation of the purpose model, the data stored in table fields of the database, is now further amenable to querying based upon purpose information. This is shown in FIG. 1 by the user communicating a query 130 to the interface of the application.

The engine then processes the query according to the purpose model, generating a modified query 132 that includes purpose information which is sent to the database. The engine generates an initial query response 134 by doing a recursive traversal 136 of all linked tables to retrieve relevant data.

The engine may return these initial query results to the interface for display to the user. Alternatively, the engine may also further process the query results into modified query results 138 according to the purpose information prior to communication to the user (e.g., to render the query results into intelligible form including accompanying text). This text is then presented to the requestor of the data e.g. by printout and sent via post mail.

Figure 2:
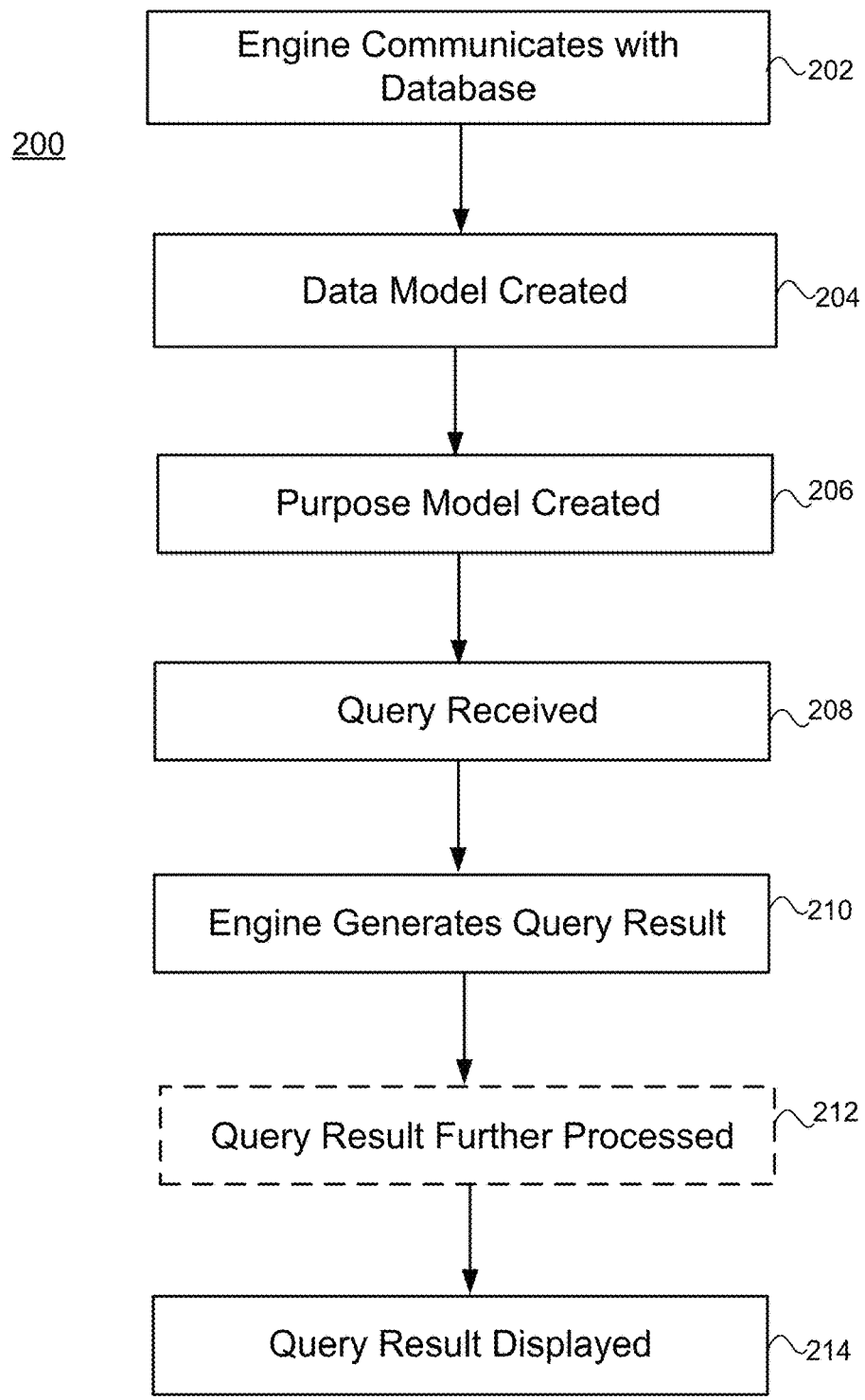
FIG. 2 shows a simplified flow diagram of a method according to an embodiment.

FIG. 2 is a simplified flow diagram showing a method 200 according to an embodiment. In a first step 202, an engine communicates with a database containing a plurality of tables.

In a second step 204 the engine references a first table field to create a data model including links between certain of the plurality of tables. In addition to the formation of table links, this data model creation may involve a table clustering process.

In a third step 206, the engine assigns purpose information to the first table field to create a purpose model. In a fourth step 208, the engine receives a query relating to the purpose information.

In a fifth step 210, a query response is generated with reference to the purpose model. This may involve the engine recursively traversing the certain of the plurality of tables to match the purpose information.

In an optional sixth step 212 the engine further processes the query result according to the purpose information. In a seventh step 214, the engine delivers the query response for display at an interface.

Certain embodiments are now described below in connection with a specific example shown in FIGS. 3A-4L. This example shows a data information framework in the context of collecting personal data from a Customer Relationship Management (CRM) system available utilizing the NetWeaver (NW) ABAP platform available from SAP SE of Walldorf, Germany.

Example—Data Model Creation

As previously mentioned, stored personal data that is subject to national laws regarding privacy restrictions, may be one context supporting the use of a data information framework according to an embodiment. Examples of data privacy regulations give data subjects the right to request personal data stored and processed by a company. Examples of regulations include the German Federal Data Protection Act BDSG (sections 19, 34), or the European directive 95/46/EC (section 38). According certain such laws, a data subject is entitled to production of such stored personal data in intelligible form.

In order to reduce the effort for customers in locating such data, a centralized tool may be created allowing triggering of automated retrieval of all personal data for a specific data subject from different applications across a company. It is to be ensured that only the data subject will receive collected information.

Personal data may, depending on legislation/law, only be stored by customers for specific purposes. The supplier of the centralized tool need not know the purposes of why personal data is being stored or processed by customers.

However, customers may be required by law to maintain such purposes for every personal data entry. Therefore a functionality is to be supplied allowing customers to maintain purposes used within their company, and allowing defining personal data related to this purpose, taking into account that there can be hundreds of purposes.

Purposes are business-process specific, and one purpose applies to one or more applications (possibly cross-system). Additionally, the same data can be used by multiple purposes.

Personal data, like any other data, is stored in specific fields of database tables. Those tables containing personal data have been identified and are linked, e.g. by key fields as described below in connection with the data model. By performing a recursive traversal of all linked tables any personal data can be retrieved.

The output of the personal data on the data subject is to be rendered in intelligible form. The framework can allow maintenance of customer defined field names per purpose, as well as customer defined text for the values of a field per-purpose, (e.g. a value "X05" could be defined by a customer as "hired"). In this example, by default known information based on DDIC data dictionary entries and field values can be used.

The framework may also use Integrated Lifecycle Management (ILM) functionality to determine the retention periods for each data found, and report this to the data subject.

In this example, access and retrieval of archived data may be handled by a "Generic Smart Search" (GSS) database search component that is available from SAP SE. That component may be used for:
automatically creating a data model; the Information Framework will call GSS function modules to find links between tables; and
collecting personal data in systems based on an input criteria (e.g. customer number) and creating an XML file with the results.

Non-SAP ABAP systems may also be connected. Under such circumstances, Remote Function Call (RFC) function module interfaces may be documented to allow third party vendors to create the required implementations.

The following describes basics of the framework according to this example, covering topics such as the definition of personal data in the system, the collection of data, and the resulting output. Later below are described the user interface to the framework, and further tasks to be performed by a customer upon receiving the framework.

In this example, the Information Framework will be located in the SAP_ABA application layer, allowing use throughout the NetWeaver ABAP system. The process of creating a data model to retrieve personal data, is now outlined.

As the supplier of the framework, SAP will first perform automated generation of a data model. Based on ILM Objects/ILM Destruction Objects and their related archiving objects, details on the hierarchy between database tables used by the archiving object are supplied.

SAP application developers will then perform verification/enhancement of the data model. The data model will be delivered to customers, who are then responsible for the following actions by interacting with a Central System (described further below).

First, the customer may transfer the data model to customer's local data model. The degree of synchronization (e.g., complete, partial, none) of the imported data model and the customer's local data model is up to the customer.

Next, the customer shall be able to manipulate the data model such that additional tables are added and linked (e.g., Z-tables).

The customer will establish RFC connections from a central system to remote systems—e.g., Supplier Relationship Management (SRM), Enterprise Resource Planning (ERP). This can involve reuse of existing connections between systems or, for higher security, create new RFC connections between these systems (e.g. from SRM to ERP).

The customer will be responsible for defining purpose information that is used within the company. The customer will also be responsible for defining systems storing data related to each purpose.

The customer may define data of tables relevant for a specific purpose in a system, and cross-system. Where DDIC dictionary texts are used, the customer may optionally replace them for fields for a specific purpose, as well as defining intelligible output text for cryptic field values.

The customer triggers data collection upon request from data subject. An example of this could be to a call made to an employee in a call center.

The customer may validate and fine-tune the resulting data (limited to selected employees), and supply the final result to the requestor.

Instead of reading data based on links within the application, the data may be read from one or more newly created "helper" database tables. These tables do not usually contain data, and are created by the application. These helper tables are to be linked to each other, as is described in more detail below.

When the information framework recognizes a function module has been determined as a link between two tables, the following occurs.

First, the function module is executed. It can then execute application specific coding which stores the required data into one or more helper tables. The function module is finished and returns.

Next, the data from the helper tables are retrieved by the information framework. The collected data will be removed from the helper tables.

The central system mentioned above, is now described. Customers define a NetWeaver ABAP system as their "Central System" for the information framework. This Central System will be the point of interaction for administrators, data privacy officers, and customer facing employees, (e.g., call center workers).

This Central System is used for maintenance specific tasks as well as triggering the collection process of personal data based on a user input. This Central System can either be a dedicated NetWeaver ABAP system used solely for the Information Framework, or an existing NetWeaver ABAP system (which runs e.g. ERP).

Where the Central System is not a stand-alone system, a new client should be used within the existing system. This approach for the information framework is motivated by one or more security concerns.

For example, using a new client may avoids misuse, by limiting the amount of users able to work with the Information Framework. Though authorizations will be used in the code, misconfigured users with too high authorizations could be able to misuse the functionality.

Use of a new client may also address remote access issues. RFC connections accessing the central system require client specific users. As no RFC connections shall be possible to the central system, setting up no users for RFC connections prevents this.

Use of a new client also relates to database access. In particular, certain commands are client specific, preventing the inspection of temporary data which is currently being collected by the framework.

As described herein, the term "Central System" refers to both to a separate, dedicated Central System, as well as one comprising a new client within an existing system.

Reasons for using a Central System instead of spreading the functionality across all systems at the customer site may include one or more of the following.

One factor is ease of system landscape maintenance. In a customer landscape with hundreds of systems, it is a challenge to get an overview of all systems by itself. Also, it is required to maintain all systems which contain personal data, and how these are connected to each other.

Further, the Data Privacy Officer/Data Privacy Specialist will work on one system only, while being able to define data in every attached system down to a table/field level. This central view allows the Data Privacy Officer/Data Privacy Specialist to see the complete picture of the systems used containing personal data.

The Central System also provides security regarding users. For example, employees required to conduct work regarding "DP&P Information" will have users created only on the Central System with a specific role instead of hundreds of systems. Users can easily be removed as well later on.

Furthermore, data regarding a data subject may only be collected via RFC from attached systems and made available to selected employees. Users shall be unable to collect data from attached systems and see the results. Users shall be capable of executing only limited transactions.

The system may not require any connections from other systems than those directly attached to it. The number of RFC function modules which are exposed by the Central System and can be called from external systems are limited. UCon (Universal Connectivity) could be used to set up a secure system at the customer site.

Integration with other systems is now discussed. Communication between systems is done via RFC.

For the Central System, RFC is used for maintenance of the data model, the purpose information and modelling of these purposes in various application systems (ERP, SRM, CRM) within the customer's landscape. RFC connections to relevant systems are to be defined. This calls for importing and exporting of the relevant models between the systems using RFC.

For the application systems, these are called from the Central System. The application systems may also call any other attached system allowing cross-application communication (via RFC).

Figure 3A:
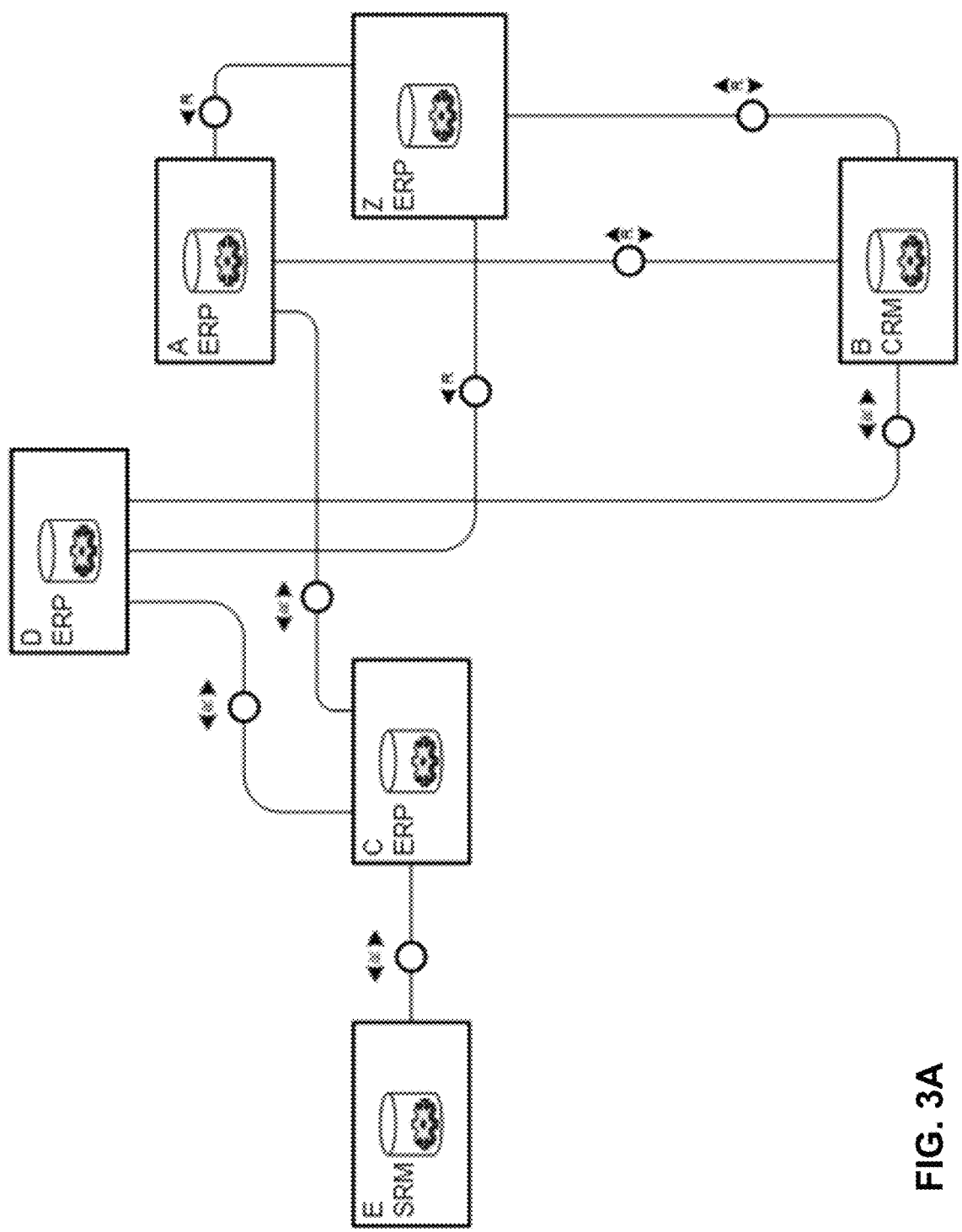
FIGS. 3A-N illustrate various aspects of an embodiment of model creation for a data information framework according to an example.
Figure 3B:
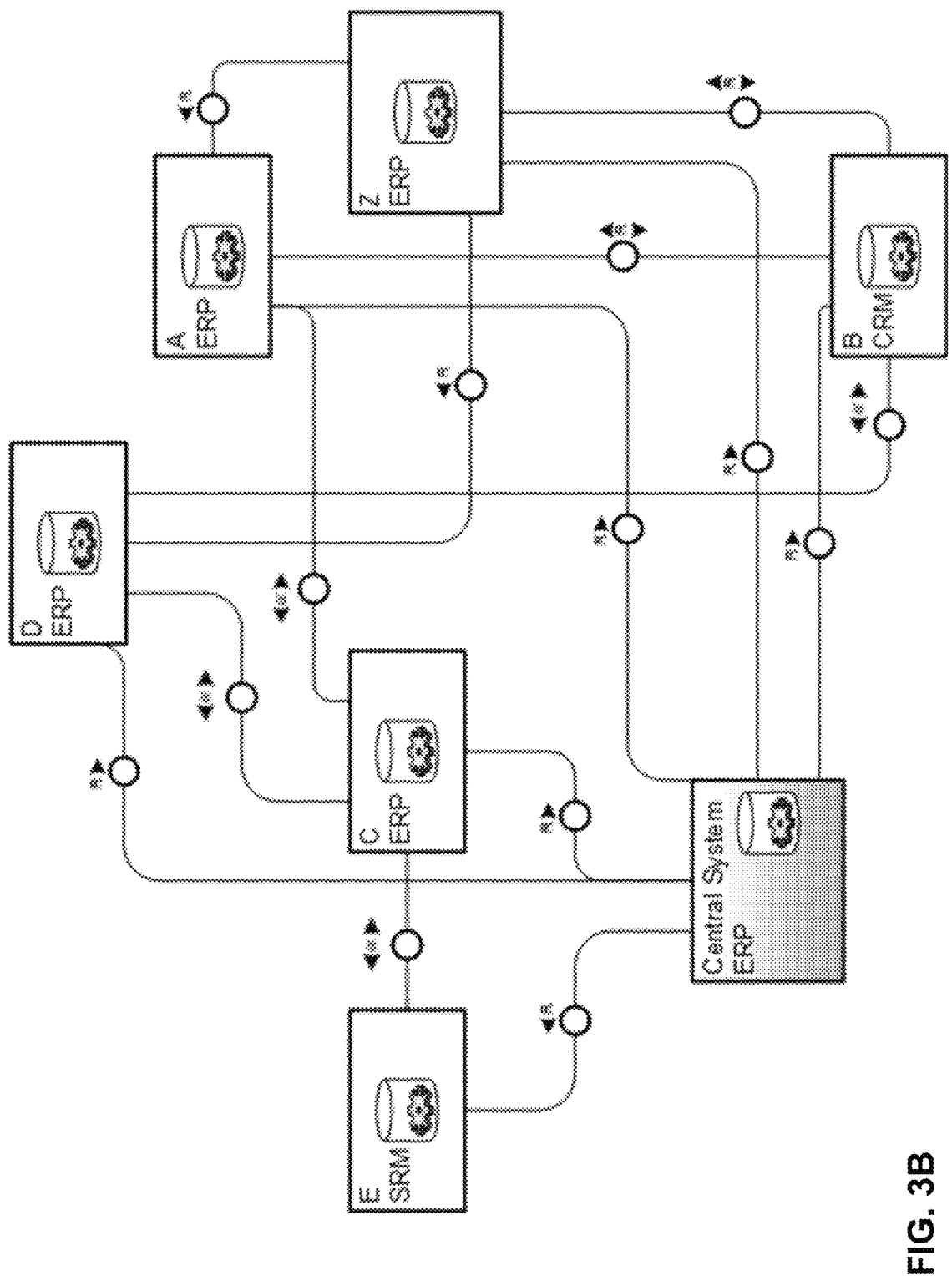
Figure 3C:
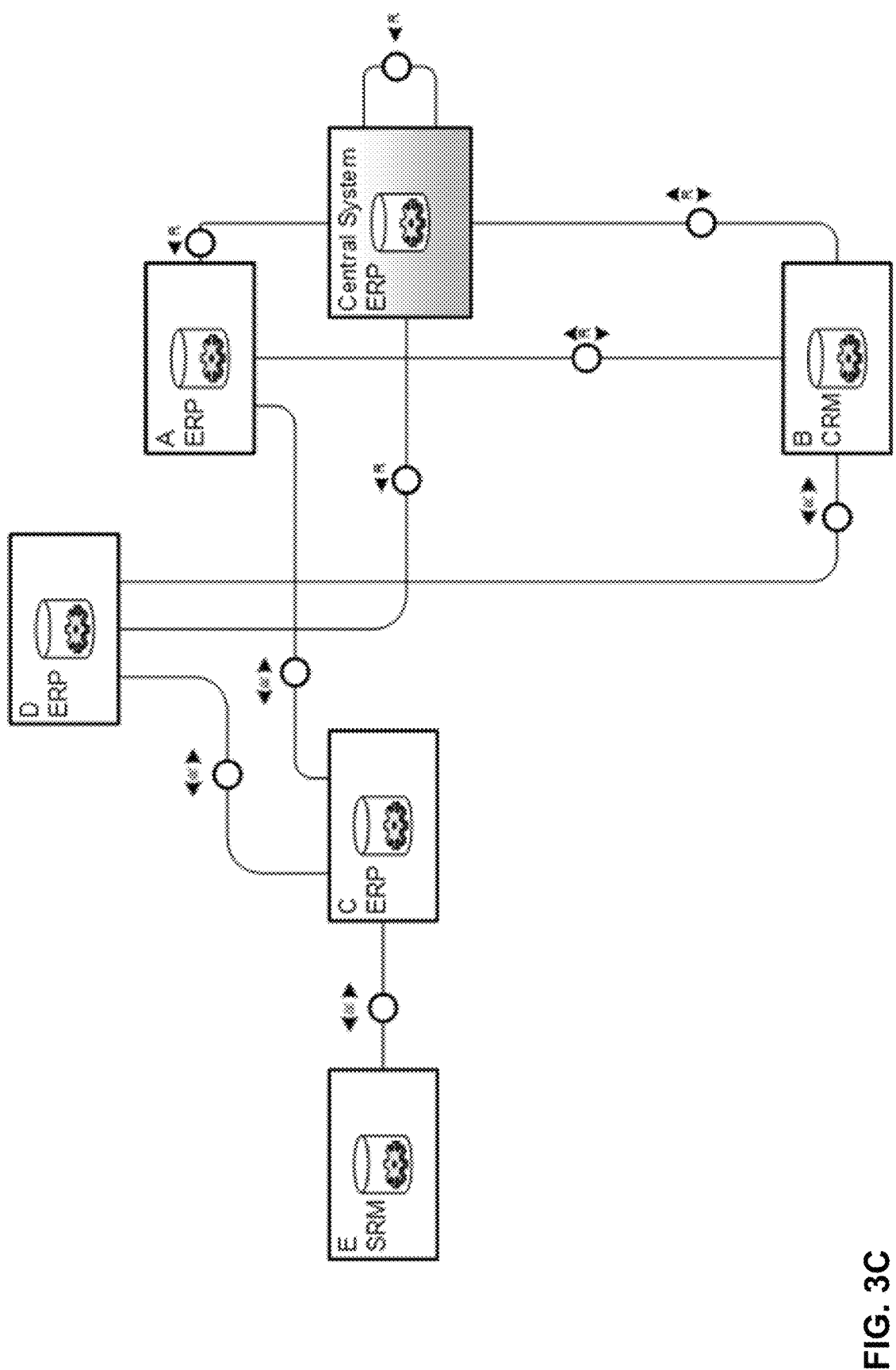

An example of the customer's initial system landscape is shown in FIG. 3A. FIG. 3B shows how the Central System is integrated into the system landscape in case of using a new, dedicated Central System. FIG. 3C shows how the system landscape is integrated in the case of reuse of another system.

The data model for the information framework is now described. That data model serves as the foundation for the data collection process.

The model contains relevant database tables. It describes links between tables, and also groups of related tables—"Table Clusters" (TCs). The model describes how different TC's are linked. The data model can be adjusted (e.g., to cover additional specific tables).

The purpose model uses the data model as its basis. The purpose model is discussed further below.

Creation of the data model is now discussed. In certain embodiments, a data model may be created based on information stored in ILM Objects/ILM Destruction Objects and their related archiving objects, which are linked to the selection criteria.

For the SAP Business Suite, data including but not limited to the following, may be used to automatically create the initial data model:

ILM Objects and their related archiving objects (input specified by the user) as well as ILM Destruction Objects;

database tables defined for these objects ("hierarchical structure" definitions for an archiving object in transaction "AOBJ");

the related BOR objects;

associated archiving classes (transaction "ACLA");

type of the database table;

check tables associated to fields of a table are taken into account (only if they contain application data);

automatic check for tables useful as starting points to retrieve data and should therefore be linked to the found tables;

fields of a table are ignored in the analysis (based on their domains, e.g. dates and too short entries which are not distinct enough).

Based on the above information pools, coding is executed (amongst others based on the GSS) which tries to identify links between tables based primarily on field matching and domain comparison. The detected links are persisted in a database table for later use and manipulation.

For "S/4HANA Cloud Edition" a slightly different approach may be used. There, the data model is generated as described above. CDS Views can also be used to enhance the model.

The automatic creation of the data model for the "MM_EINA" (Purchasing Info Records) ILM Object, creates the initial data model output shown in FIG. 3D. This figure is highly simplified for purposes of illustration. It shows the model 300 as comprising tables 302, fields 304, and key fields 306 of a table not having a link associated to them. As 306 is a key field, field 304 may be linked to the key field 306 in another table.

FIG. 3D further shows the field to field links 308 between tables. Links between tables can be unidirectional (1:n notation). There, a father-son relationship exists between two tables. The father table would e.g. be a Purchase Order, the son table would contain several Purchase Order items related to this Purchase Order.

Links between tables can be bidirectional (n:m notation). Unlike the unidirectional relationship, there is no specified father or son. For example, a Shopping Cart in SRM may have Purchase Orders in an ERP MM system. The same applies for the opposite direction as well however.

As indicated above, the initial model of FIG. 3D is highly simplified, in reality a very large number of tables would likely exist. Having such a large number of tables makes it difficult to do modelling.

Thus, in order to improve maintenance, tables can be grouped together as table clusters (TC). The grouping shall follow a logic, e.g. it may be based on the application component/software package associated with each table.

Figure 3E:
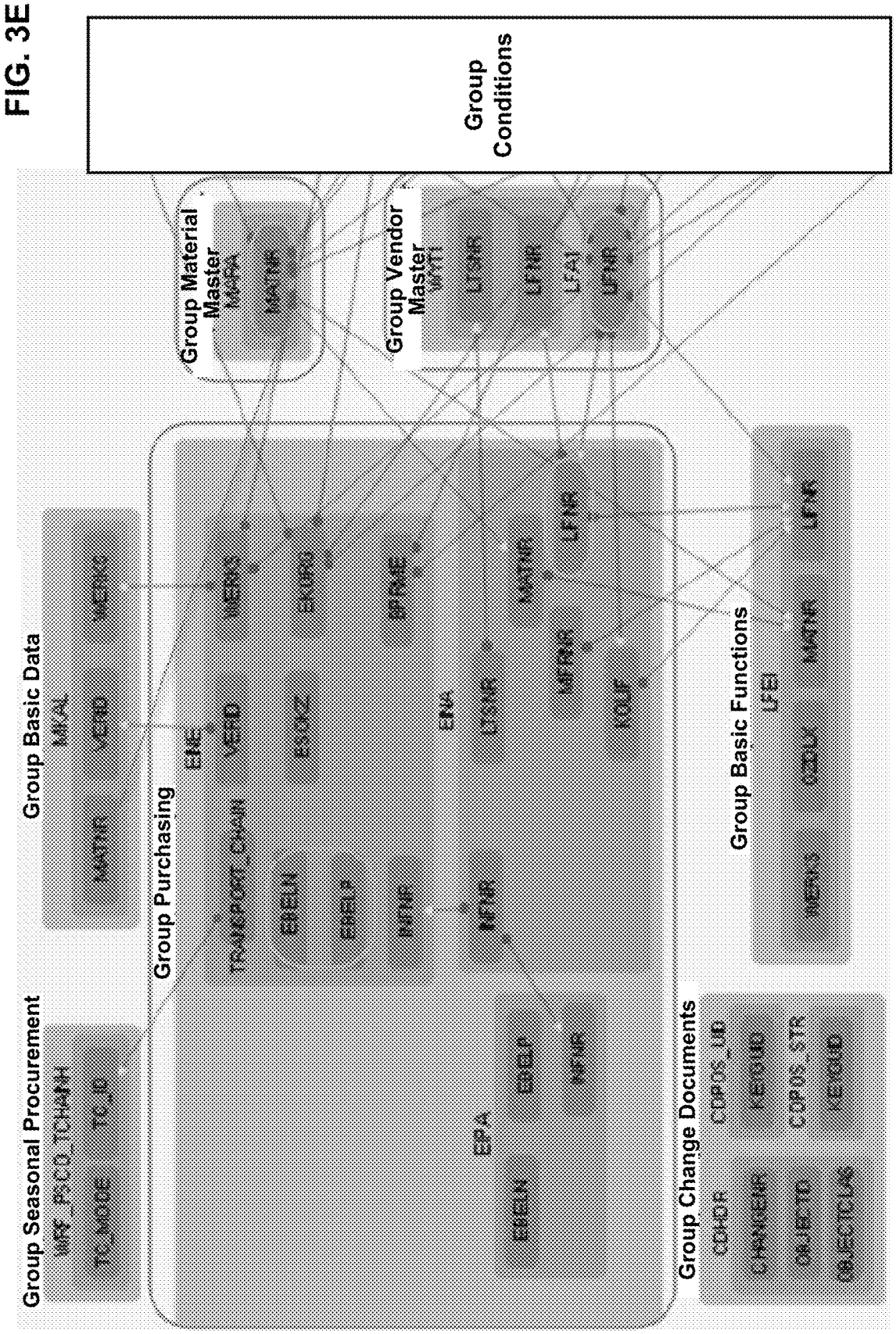

FIG. 3E shows the result of this grouping which will be done automatically. In particular, FIG. 3E shows in greater detail the data model featuring Table Clusters. As shown, tables which are associated to the "Seasonal Procurement" application component/software package will be grouped together into the "Group Basic Data" TC.

Table Clusters can be linked by linking at least two tables, one from each TC (all fields required to allow retrieval of a desired entry are available in both tables). Table Clusters can be linked by a function module if data from several tables is required and code has to be used to retrieve the data or to define data to be used for calling a different system via RFC and collect data therefrom.

For simplification of illustration, in this example FIG. 3E shows five table clusters. Each TC is in the responsibility of the corresponding application developers to which they are associated, who may need to adjust the data model for their Table Cluster.

One table cluster shown in FIG. 3E is the Vendor Master. The vendor number (LIFNR) can be considered a header field/table combination. This makes sense especially as the vendor number could be the criteria based on which personal data related to that vendor shall be collected. As this is a Table Cluster that is reused by several different applications and required by other Table Clusters, these shall be defined once and can then be reused without additional work.

Another TC of FIG. 3E is the Material Master. This table has only one key field and can therefore be defined as the header table/field combination. It is, like the Vendor Master, a reusable Table Cluster.

Still another TC of FIG. 3E is Purchasing. Data from this table can be retrieved using the header table "EINA" and the fields "LIFNR" or "MATNR". Additionally, though not described here, the header table "EINE" with fields "EBELN" and "EBELP" as this would allow linkage to a table cluster handling e.g. Purchase Orders.

Yet another TC of FIG. 3E is Change Documents. The tables are not linked to any table or field directly. A function module may be created to retrieve related data for a given input.

Still another TC of FIG. 3E is Conditions. This TC has several tables which can be accessed directly. A function module may be used to retrieve related data from this table.

Linking of local TCs is described as follows. Table clusters are linked to each other. This can be done using a link to a header entry and/or function module of the target TC. Here, the Vendor Master, Material Master and Purchasing TC can be linked via tables.

Linking of cross-system TCs is described as follows. Table clusters are, as before, linked to each other. However, a link now contains a Function Module. The coding within the Function Module determines the required data for the cross-system call (e.g., the destination system to be called), with which input the call shall be conducted (values for the links to the other TC). After this data has been determined, GSS will be able to do the appropriate mapping to call the destination system and retrieve data therefrom.

Figures 3F, 3G:
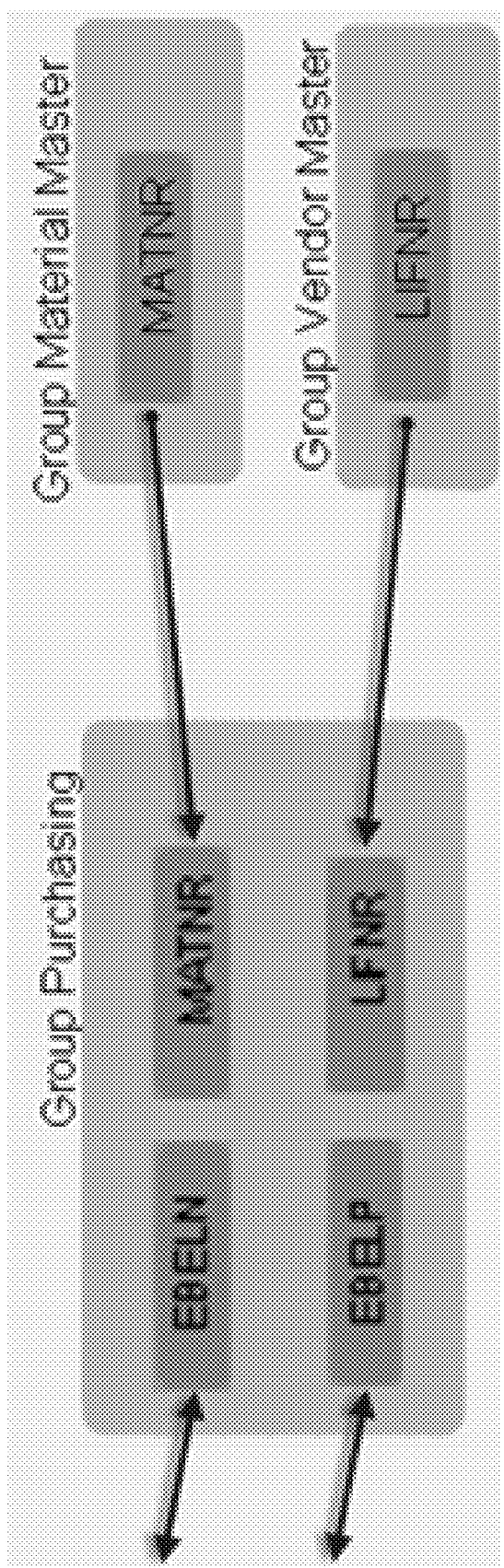

On a higher level (reducing the information presented to the user), FIG. 3F shows how the Table Cluster are linked to each other (fields "EBELN" and "EBELP" will be bi-directional, but the linked Table Cluster from "MM_EKKO" is not shown here). At such a level it is possible to link the Table Cluster without having to think on what tables are actually used within the target Table Cluster and how that one is linked to other Table Cluster.

There may be scenarios in which the links between database tables can give rise to recursions. Undesired recursions may be prevented as follows.

One example relates to retrieval of data for a business partner:

The business partner is found in table "BUT000" ("BP: General data I") which contains data like name, nationality or date of birth).

The table "BUT050" ("BP relationships/role definitions: General data") stores the relationship between two business partners as well as information about it, e.g. validity dates.

The following data should be retrieved (from tables BUT000→BUT050→BUT000):

"Business Partner 345" (BUT000), "John Doe, USA, 30.3.1980" (BUT000) has "Business Partner 678" (BUT050), "Jane Dunn, Canada, 10.5.1960" (BUT000)

"Business Partner 690" (BUT050), "Ady Kusha, Canada, 10.7.1990" (BUT000)

Once data from BUT000 for a related partner has been determined, there shall not be any more recursive retrieval of data from BUT050, in order to prevent the following case: "Business Partner 345" (BUT000), "John Doe, USA, 30.3.1980" (BUT000) has a "Business Partner 678" (BUT050), "Jane Dunn, Canada, 10.5.1960" (BUT000) "Business Partner 18745" (BUT050), "Jason Voorhees, USA, 6.6.1966" (BUT000) "Business Partner 3621", . . . .

To prevent this, the link between "BUT000" and "BUT050" is defined as "Border". The Border definition will allow for a one-time traversal of the table, allowing BUT000→BUT050→BUT000 but preventing BUT000→BUT050→BUT000→BUT050→ . . . .

The purpose model that interacts with the data model, is now described. In addition to having to model the system landscape as a customer, specific purpose information which the company's Data Privacy Officer/Data Privacy Specialist has defined, will be entered in a UI similar to FIG. 3G. In addition to a unique identifier ("Purpose"), a description is used which will can later be referenced to provide intelligible output to the data subject. This description could be maintained multi-language and as long texts if desired.

After the purpose information is defined and maintained, the following occurs:
1. the systems in which data related to each purpose are stored, are specified;
2. the data (tables/fields) to be retrieved for every purpose are specified.

The framework can assist this process by allowing grouping, sorting, and other techniques.

Data retrieval may occur as follows. The data model exposes two entry TCs for access from a calling system via RFC (e.g., the "Vendor Master" table as well as the "Material Master" table of FIG. 3E). It is now possible to start a data retrieval query based on the Vendor Number (triggering the "Vendor Master" Table Cluster) or the Material Number (triggering the "Material Master") from the Central System.

Based upon the system landscape, data model, and table cluster definitions, the following occurs (not all reads from the tables shown in FIG. 3E are mentioned).
1. The Central System queries each attached system (as well as the local ERP system in client 100) for every defined purpose, requesting data for the input specified (e.g. the Vendor Number).
2. Data from the "LFA1" table are collected for the matching "LIFNR" entry.
3. For found exists, related data matching the "LIFNR" entry will be retrieved from the "EINA" table.
4. For each entry in the "EINA" table, data matching the "INFNR" will be read from the "EINE" table. Additionally, data matching the "MATNR" will be read from the "LFEI" table.
5. For each entry in the "EINE" table, data matching the "VERD" will be read from the "MKAL" table.

In this example, a search for the vendor "1000" in a system produced the results shown in FIGS. 3H-K. In particular, FIG. 3H shows table results, FIG. 3I shows results for table LFA1, FIG. 3J shows results for the table EINA, and FIG. 3K shows results for the table EINE.

Flexibility for customers (the customer defines the final output) may be achieved by generating a hierarchical XML file for every entry found. This indicates that data related to an entry will be present in the node below it. The resulting XML file output would look similar to that shown in FIG. 3L.

This XML output is not fully intelligible. For example, the field "POrg" does not clarify what is meant. Accordingly, customers may be able to maintain additional texts which would automatically generate the text "Purchasing Organization" as additional information.

The same can be applied to values of a field as well (e.g., "DE" is replaced with "Deutschland" for a German vendor or "Germany" for an English vendor requesting their person related data). FIG. 3M shows the final result of intelligible XML output.

Based on the above, the customer now has the ability to review the result and to perform last-minute changes. The XML file can then be used to generate output for the data subject in a desired visual manner, and be supplied to the data subject in a specific format (e.g., as a print-out).

As described above, the determination of links between tables forms the basis for the data model. This particular example, utilizes ILM Objects used by SAP's ILM software.

These ILM Objects (or their associated Archiving Objects) contain information about database tables which will be archived.

Details regarding which table links to another table, are also stored. This data is maintained by a user.

Figure 3N:
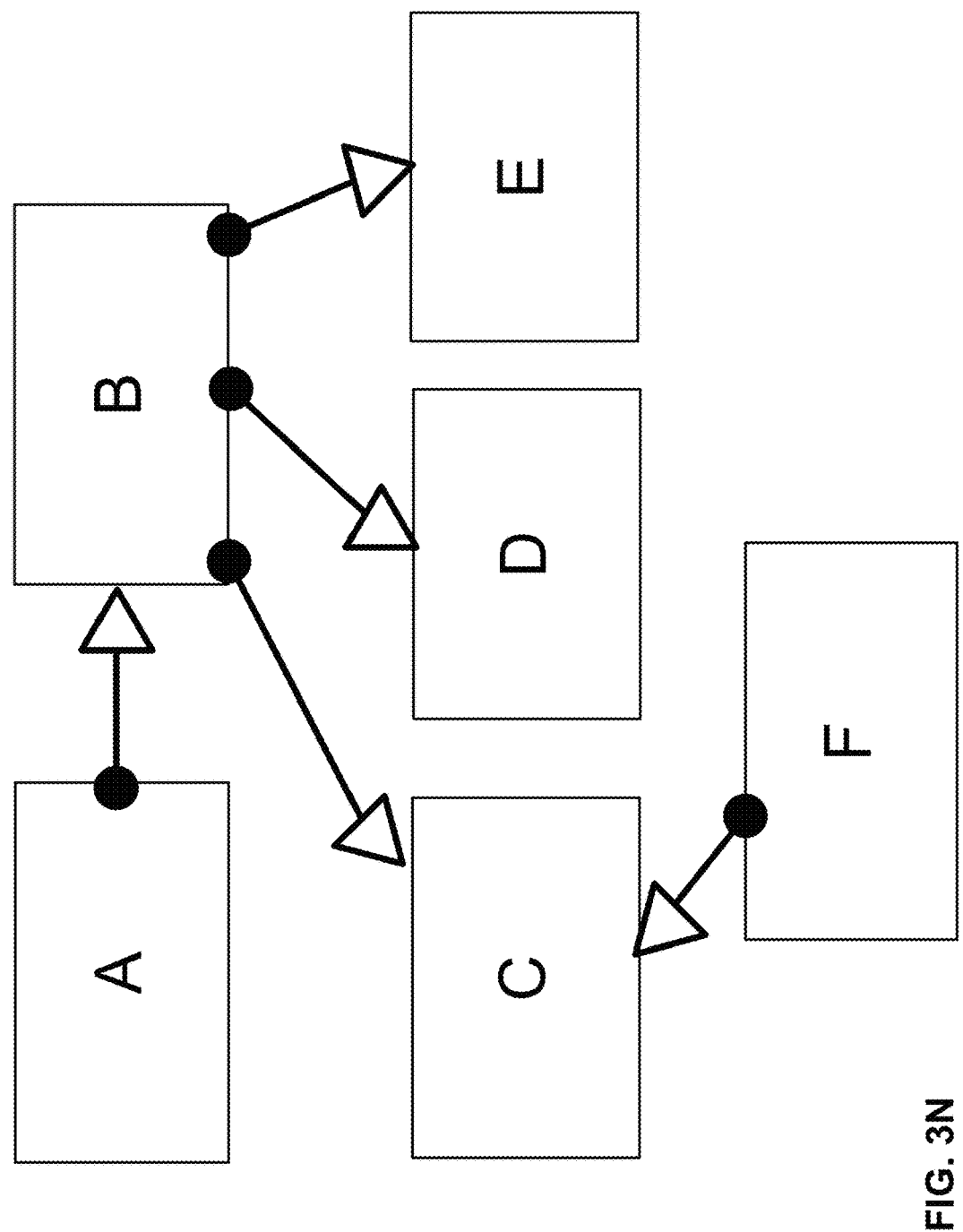

Assume the following information is available, as shown in FIG. 3N:
Table A is linked to Table B;
Table B is linked to Table C, Table D, and Table E;
Table F is linked to Table C; and
Table G is linked to Table H.

It can be seen in FIG. 3N that the Tables G and H are not linked to the other Tables.

Embodiments provide code that can determine these tables and their links based on the ILM Object specified. Then, the code performs the following sequence.
a) An entry is read from the database for a given table (starting with A).
b) Every field of the entry is looped over and checked to see if there is a matching entry (comparison is done based on the field content, e.g. "John" for field "First Name") in a linked table (B), and if found memorize this link (e.g. "John" is found in field "Name" of table B).
c) This process a) to b) is repeated several times (e.g., five times).
d) Stable links are determined. These are the memorized links which have five entries summed up—e.g., five matches were found for a "First name" of table A to the same field in table B's field "Name".
e) Additionally, entries can be filtered out which are not relevant. For example, an entry containing just, e.g., a "1", might not be considered usable as this would create too many irrelevant links.
f) If in doubt, it is possible to also compare the "domain" of the fields. If both fields have the same domain (e.g., "UNAME"), then that may also be a strong indication of a link.
g) "Checktables" may also be taken into account. These are stored in the SAP system and state that a field of table A has a "check table" (limiting possible entries), e.g., in table XYZ.

These are also taken into account.

By repeating the above process for every table (A→B, B→C, B→D, B→E, F→C, G→H), the data model is produced.

While this example focuses upon a user of ILM Objects, this is not required by all embodiments. Certain approaches could depart from using ILM Objects, instead identifying links between tables belonging to the same "Application component" (e.g. SD for Sales & Distribution, or MM for Material Management) as a first start. Other approaches could be adopt a broader approach and assume that every table might be connected to some other database table—this is the same process for a)-d) (or g) above—thereby providing an overview of the entire system.

Such a generalized process is independent of SAP database structure and could performed on many types of databases, as it comprises comparing field content with field content.

Example—Data Model Interface

User Interfaces (UIs) allow developers as well as customers to interact with the data model. The following may be performed to ease the process for customers to retrieve personal data:
1. creation of the data model (explained above);
2. assigning the purpose for applications table clusters;
3. defining fields for the purpose within their table clusters which contain personal data.

System landscape maintenance may be performed. In particular, the overall system landscape is to be modeled within the Information Framework.

As described above, a customer's system landscape may use a non-dedicated Central System. This is simplistically shown in FIG. 4A.

Here, "non-dedicated" indicates that the same system is running the Central System for the information framework as well as other business applications. Separating the information framework and business applications may be done to increase security (e.g., to prevent usual business users from also using the information framework due to a configuration mistake.

Figure 4A:
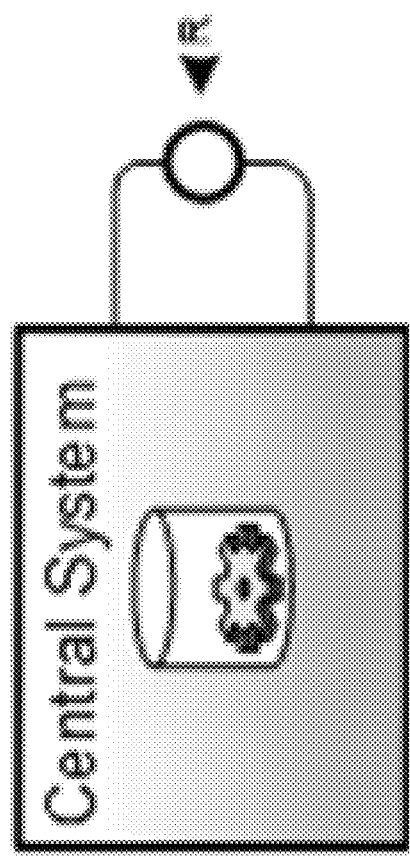
Figure 4B:
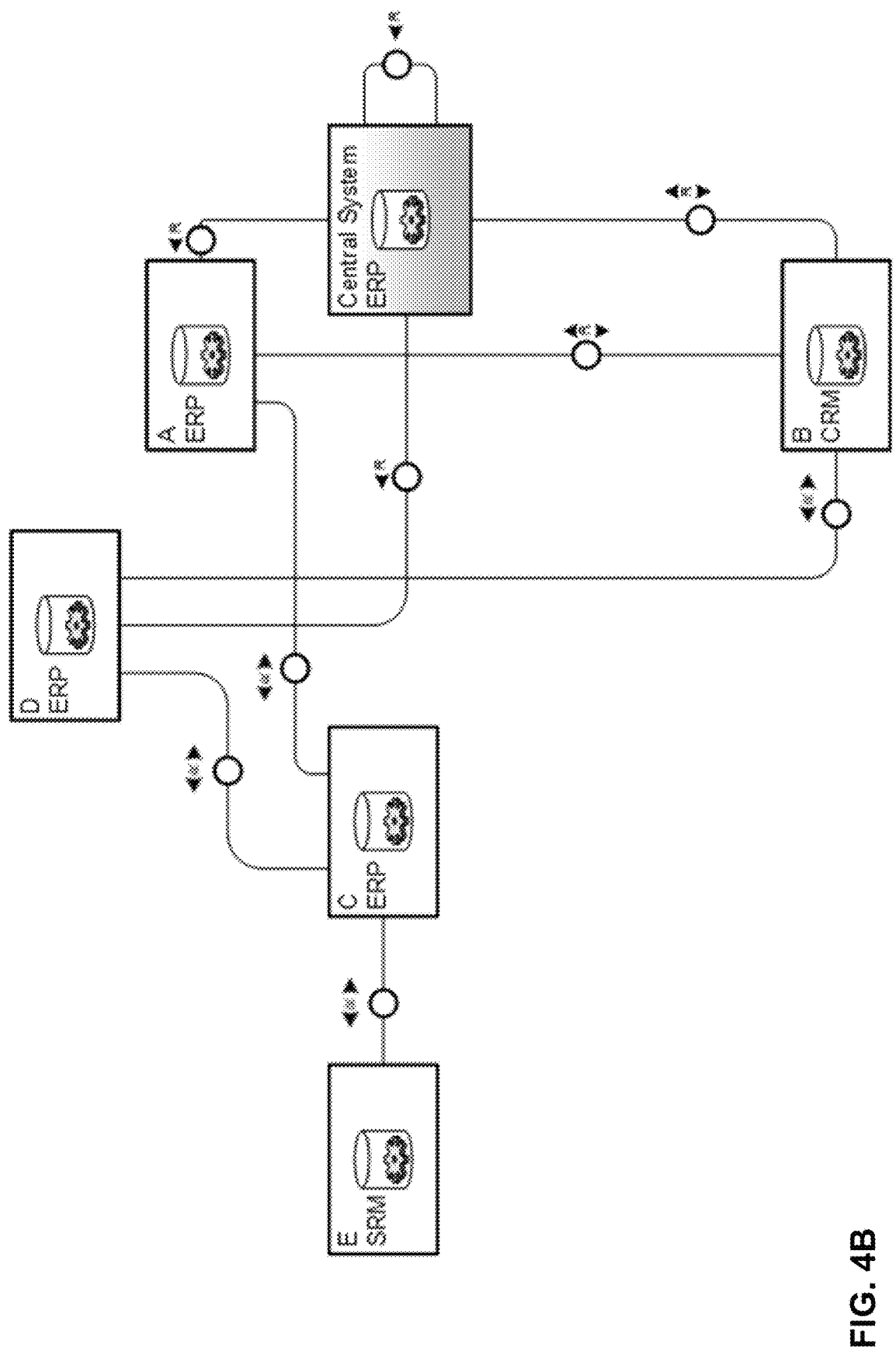

In a simplified example shown in FIG. 4B, the customer may have a total of six systems in their landscape (the Central System as well as systems A-E). Each system of the landscape may be running different applications, e.g. CRM, ERP, SRM.

Interaction between these systems of the landscape, are shown in the FIG. 4B:
the Central System communicates with systems A, B, D;
systems A, B also communicate with each other, just like B and D.
system C communicates with A, D, E—there is no direct link to the Central System.
system E only communicates with system C—there is no direct link to the Central System.

In the first step, the customer determines the systems directly connected to the Central System. Available information about such connections could be automatically retrieved (e.g. on SAP NetWeaver ABAP systems the maintained RFC connections).

However, reusing the same connection may offer a downside, in that the specific user utilized for the connection in the target system may require additional authorizations to limit execution to the information framework as a security measure. Customers frequently already confront this type of issue with users/authorizations.

Figure 4C:
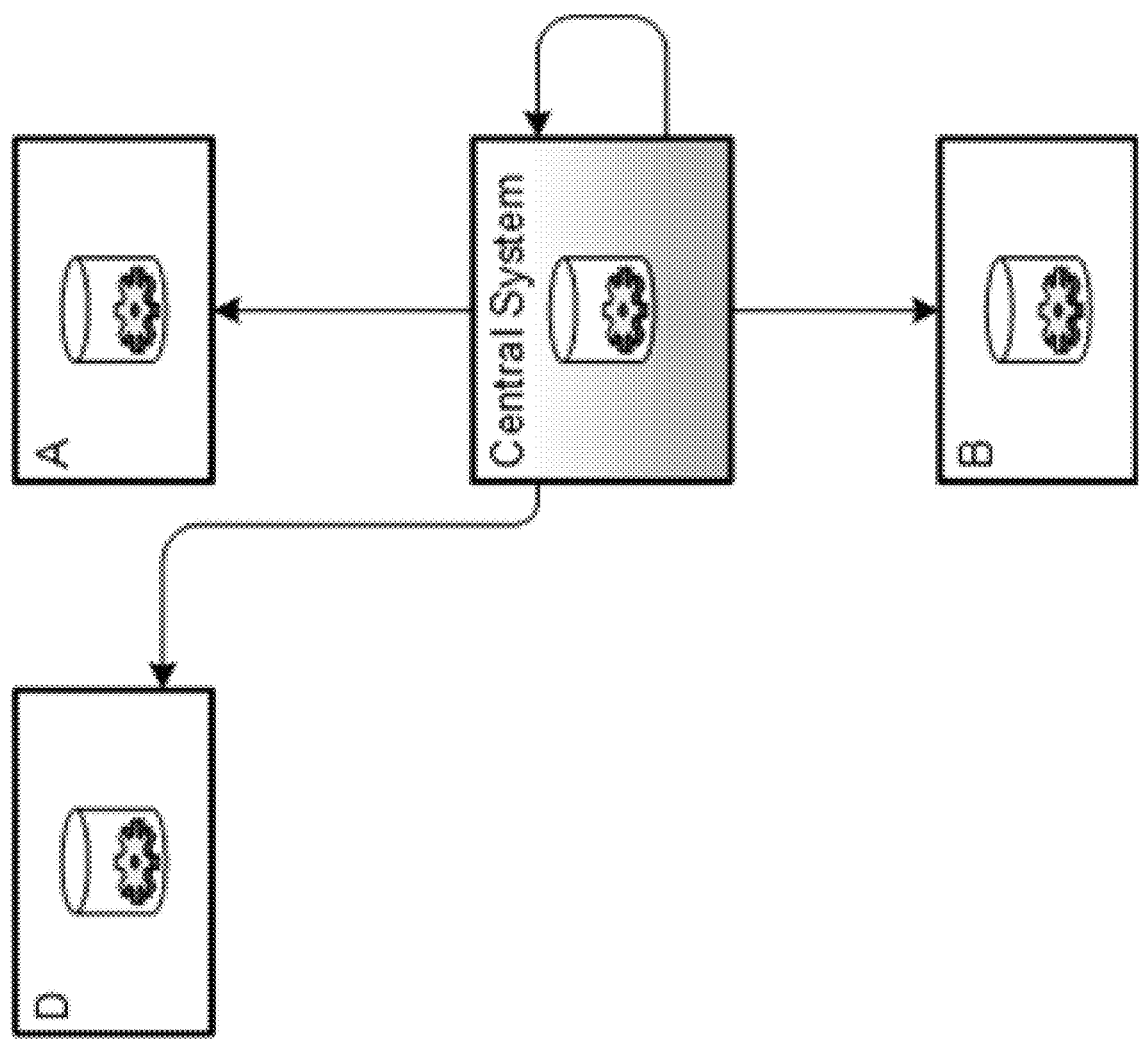

Accordingly, it may be desirable to create a new, dedicated user for use by the information framework. Internally, the Central System comes up with a result which is shown in FIG. 4C, showing directly connected systems The system may now automatically determine applications that are available on each system. Such information would then be added to the result.

Figure 4D:
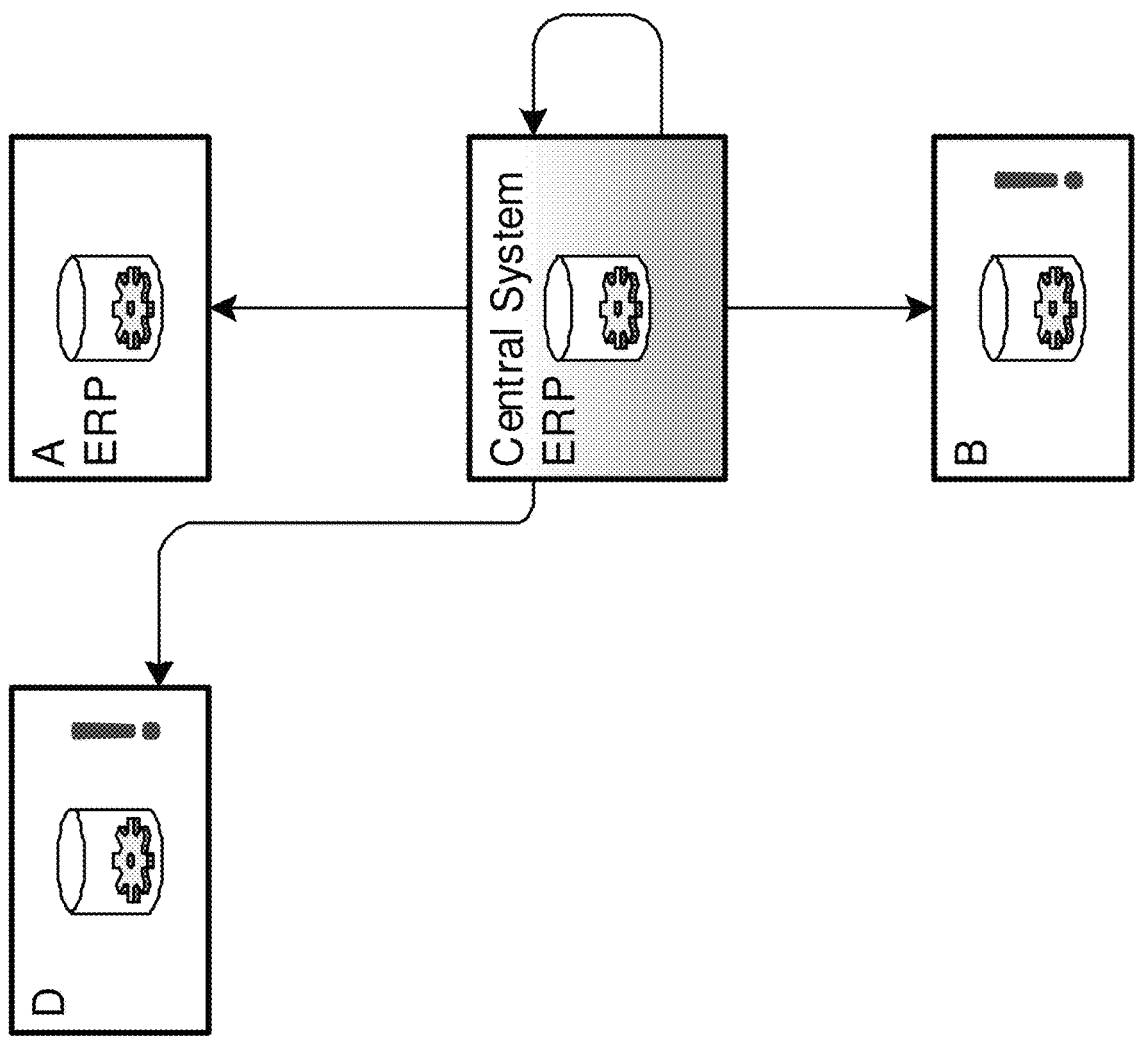

FIG. 4D shows the result of such an automated collection process. Here, the system A was identified as ERP system as the required framework code has been deployed on them already. The systems B and D do not have the framework, so nothing is automatically detected (here, visualized to the user with an "!" icon).

Figure 4E:
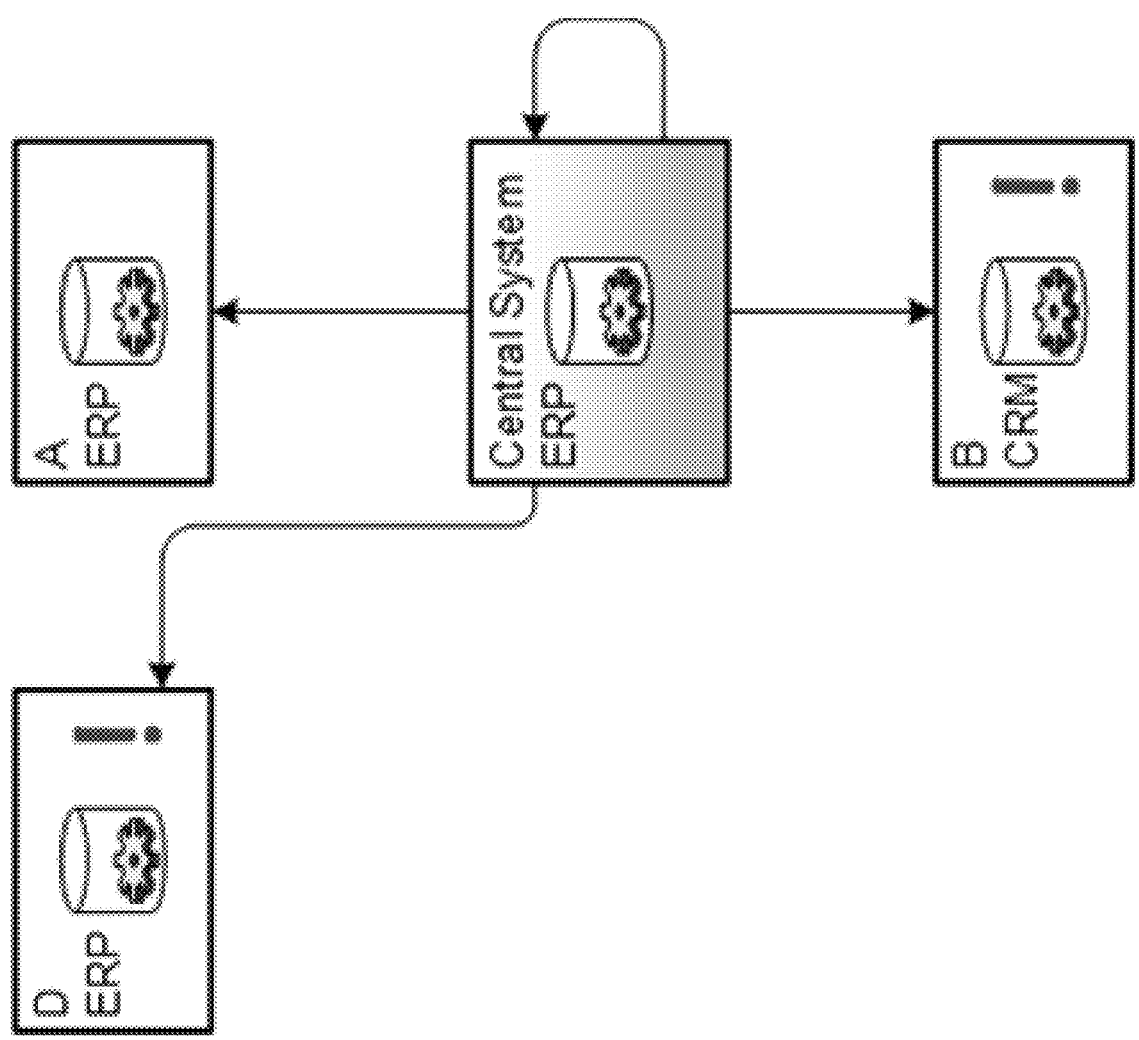

It is possible for the user to manually define applications on a system, e.g. system B runs "CRM" and system "D" also runs an "ERP". Doing so allows the customer to model their landscape fully, while at the same time being able to see which systems are not yet going to be usable by the Framework. Accordingly, FIG. 4E shows the manual addition of applications.

However, FIG. 4B indicates that the C (ERP) system is not directly connected to the Central System. Such connection is required in order to retrieve data directly from the Central System due to the business processes the customer is using.

Figure 4F:
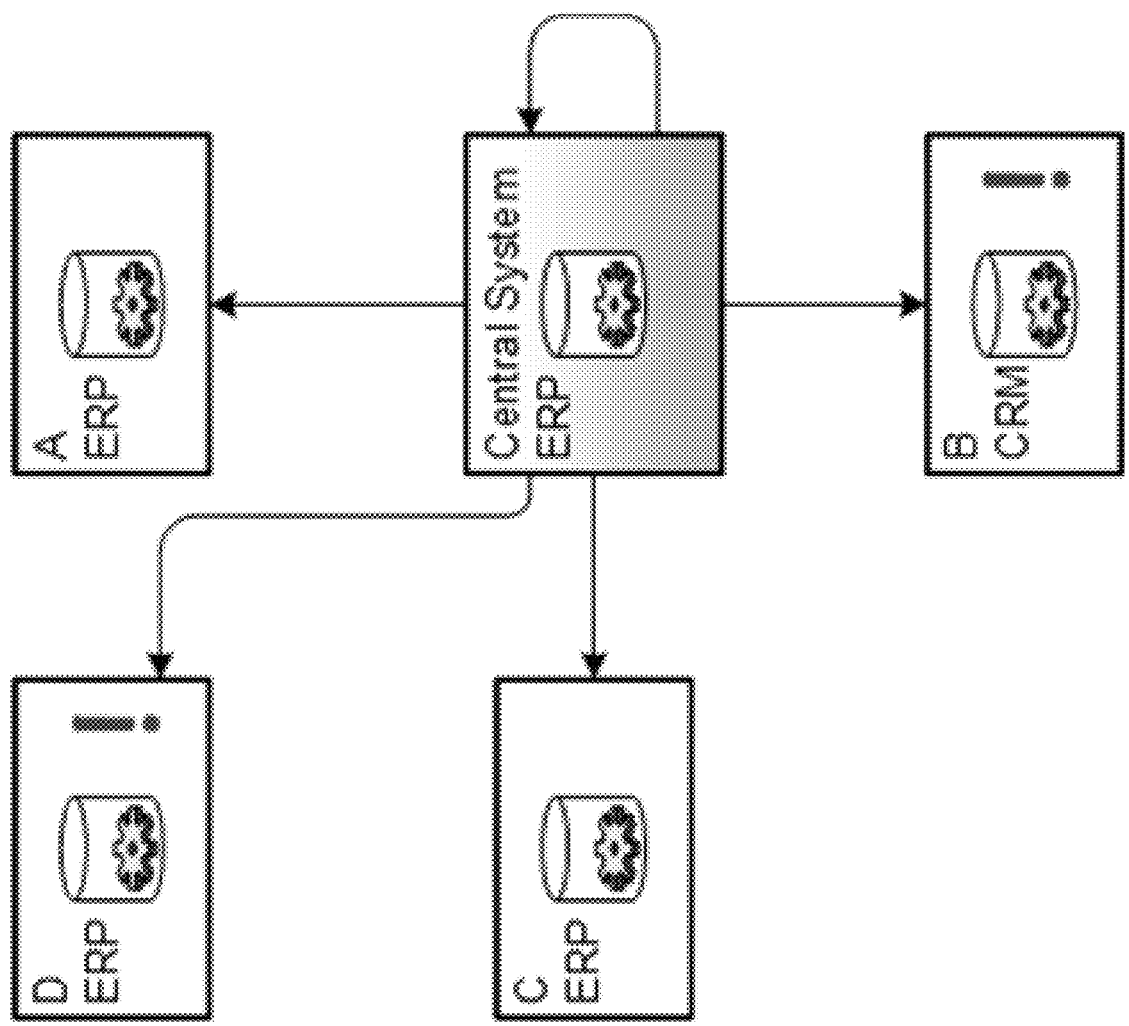

Under these circumstances the customer creates a new RFC connection to the ERP system, and can then add that ERP system connection to the modelled landscape. As the framework is installed on the ERP system, ERP as the available application is added as well. FIG. 4F is a simplified view shows the result of adding a new system.

The user can now select a system and trigger the same process on that system, e.g. via an RFC in ABAP systems. The results are sent back to the Central System, evaluated and added to the model.

Figure 4G:
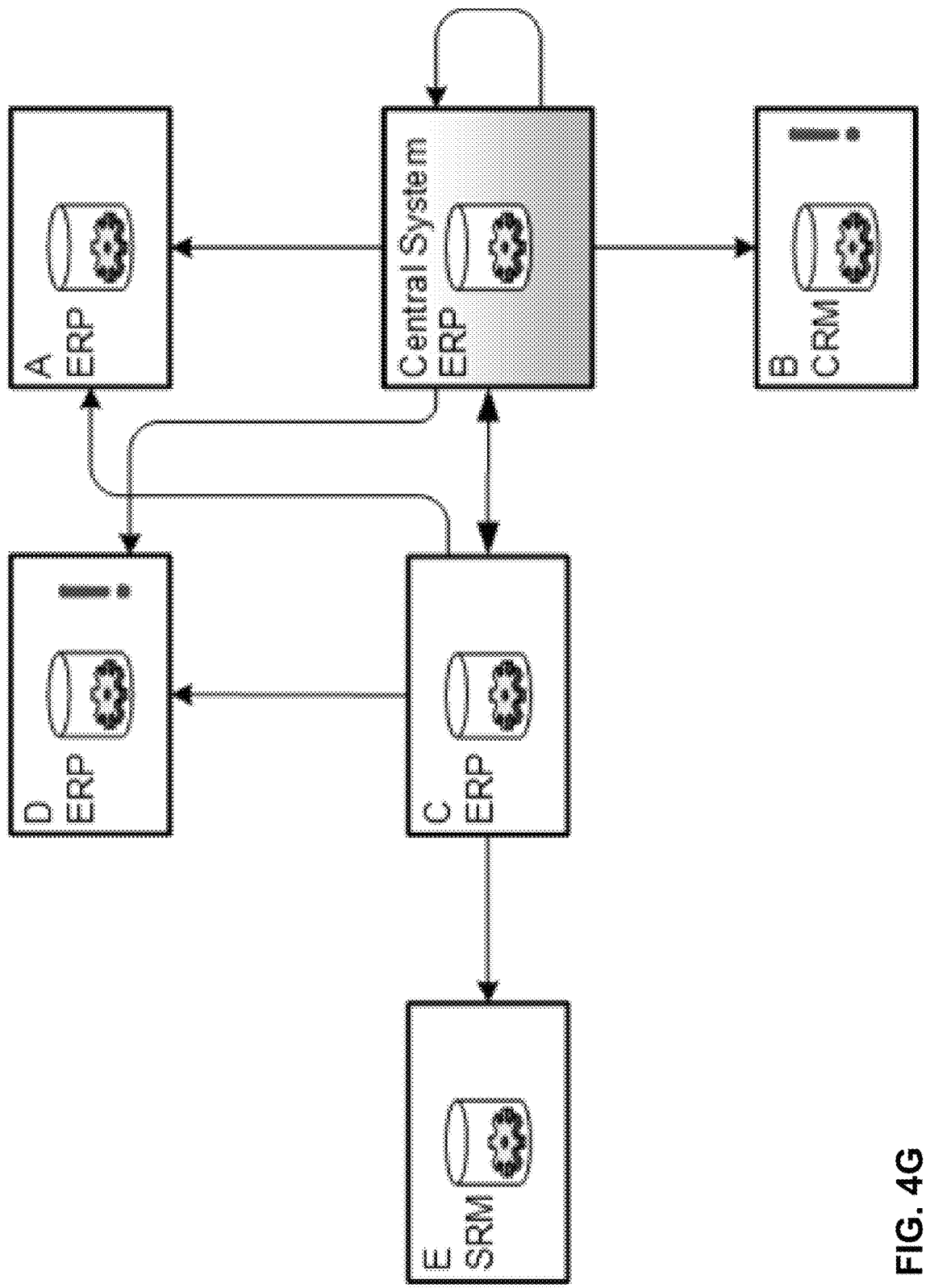

For example, the customer triggered this process on the C (ERP) system having a connection to the E (SRM) system. FIG. 4G shows the remote system result: system E is added with "SRM" available on it, and connections to system A, D and the Central System are found and added.

Figure 4H:
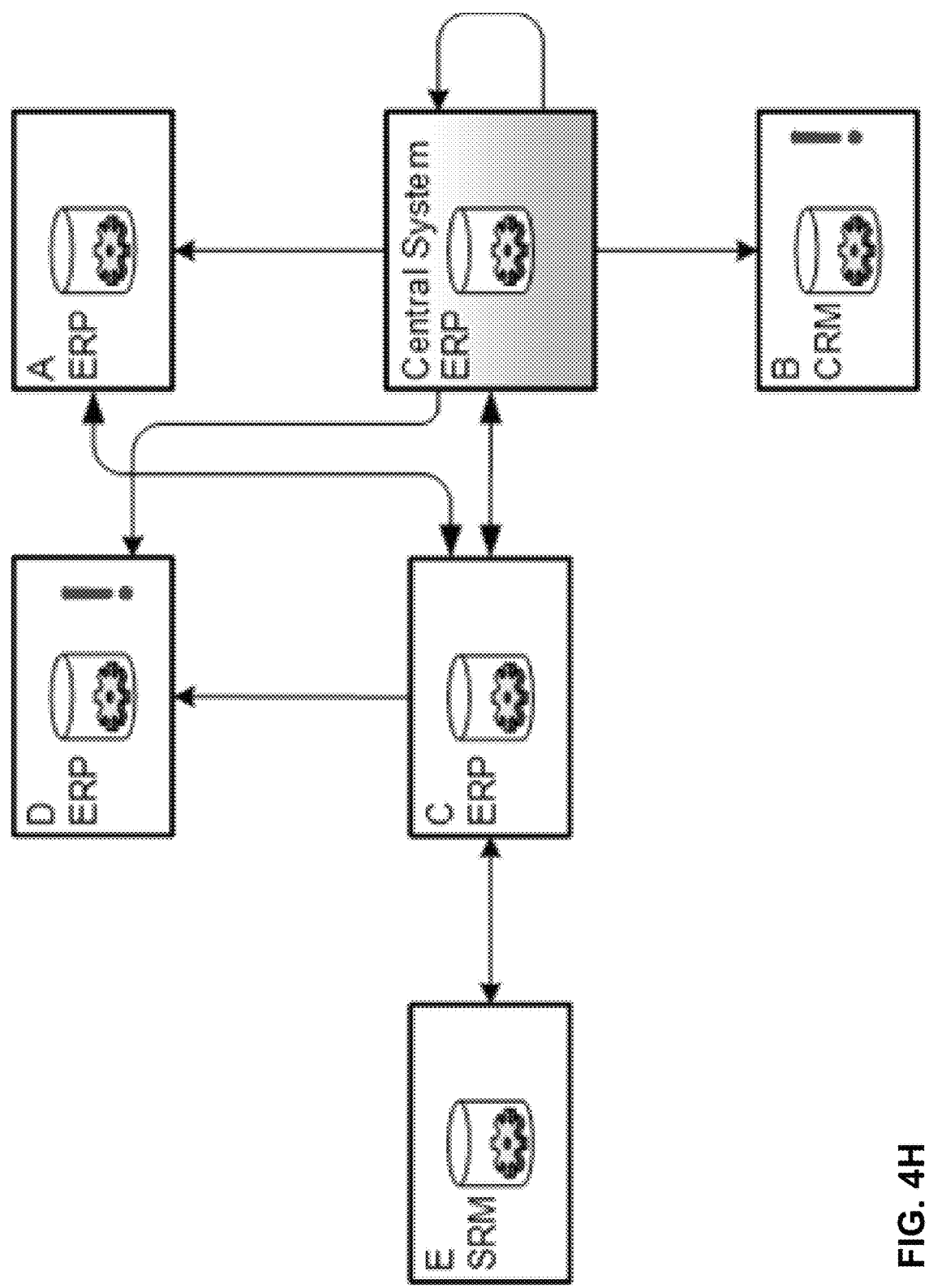

Doing this for the other systems A and E (here neither systems B nor D have the framework available, precluding execution), results in a connection from system A to system C as well as from system E to system C. FIG. 4H shows the resulting final landscape.

This process can also be automated. Where some systems are not connected to the central system, the automated process may still be supported. The Central System can pass along information with the RFC, allowing every system on any given path to the target system in order to know which RFC it should call. The result is then passed back by each RFC to the central system.

The complexity of the model can increase quickly (customer installations can comprise several hundred systems). Accordingly, a UI can therefore assist the user in this process. For example, the user could specify to only see "outer" systems of the model, and/or systems not yet triggered.

In certain embodiments the above process may be further automated in such a manner to automatically collect all connections.

RFC connections may also be checked on the systems in order to check if the authorizations are properly set up (e.g., a new RFC connection just for the Framework has been specified.) If not, this aspect may be visualized as well.

The maintenance of purpose information in this example is now described. Personal data may only be stored and processed on a system, if there is a legal reason to do so. Therefore, customers need to store the purposes they have defined for usage within their company on the Central System.

A UI will assist customers in maintaining this list. The FIG. 3G previously described, may be useful to input purpose information.

Entries in the list may not be changed or removed without a validity check being performed. For example, a purpose which is used by systems can only be removed if the user agrees to have the purposes removed from all systems as well. Similarly, renaming may require checks and consent.

The assigning of purpose information to applications (systems) is now discussed. In particular, the purposes used per application may differ.

Figure 4I:
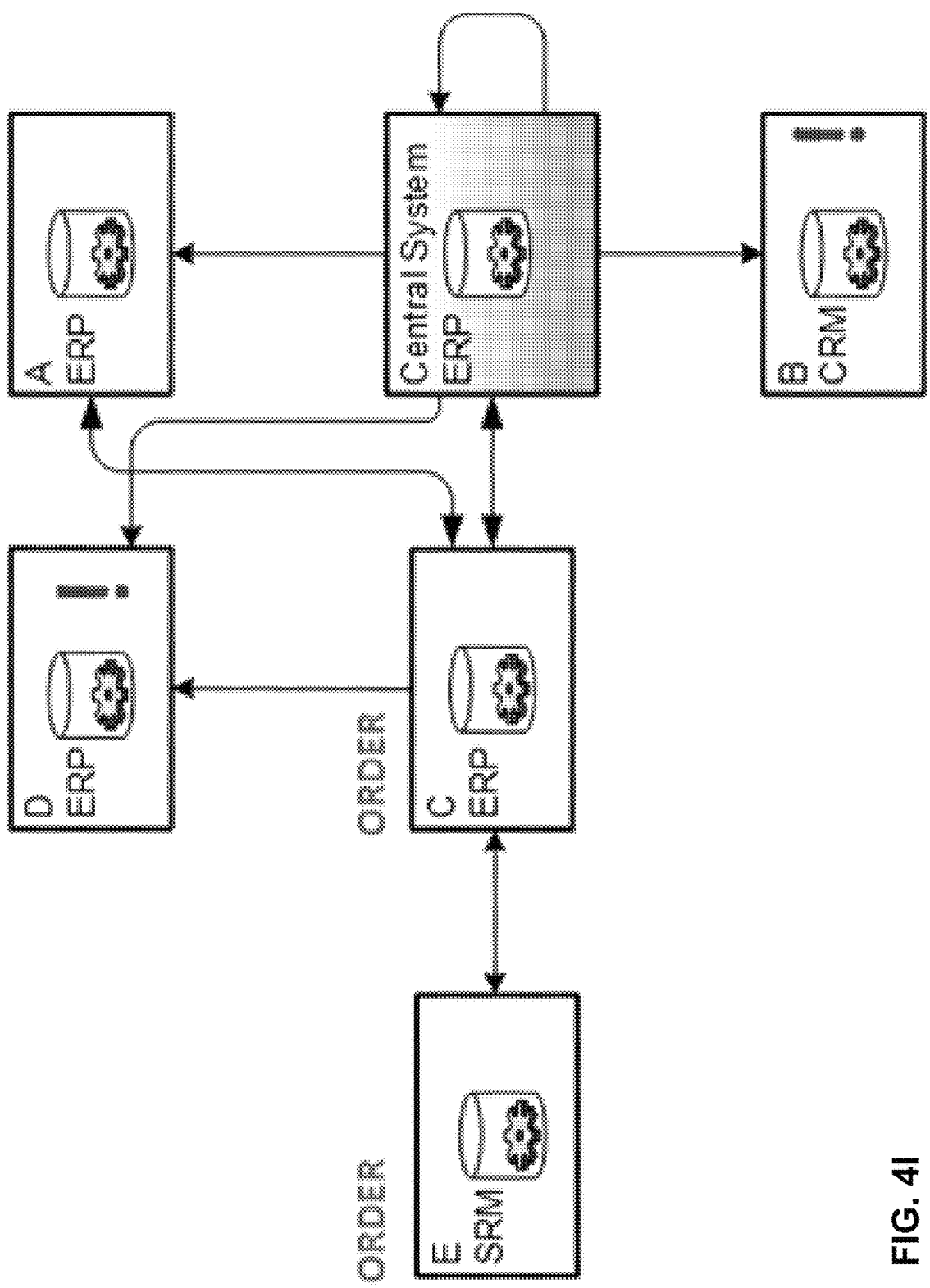

To assist a data privacy officer in performing his role, purposes can be assigned to applications (CRM, ERP, SRM, . . . ) using a UI. The systems running the application can be identified automatically as described above. FIG. 4I shows the result of adding the "Order" purpose to the ERP and SRM systems in FIG. 4H.

The UI view of the systems can be adjusted to the user's needs. For example, the view can be limited to: systems running a specific application, systems having no purpose maintained, systems those matching a particular purpose, etc.

Figure 4J:
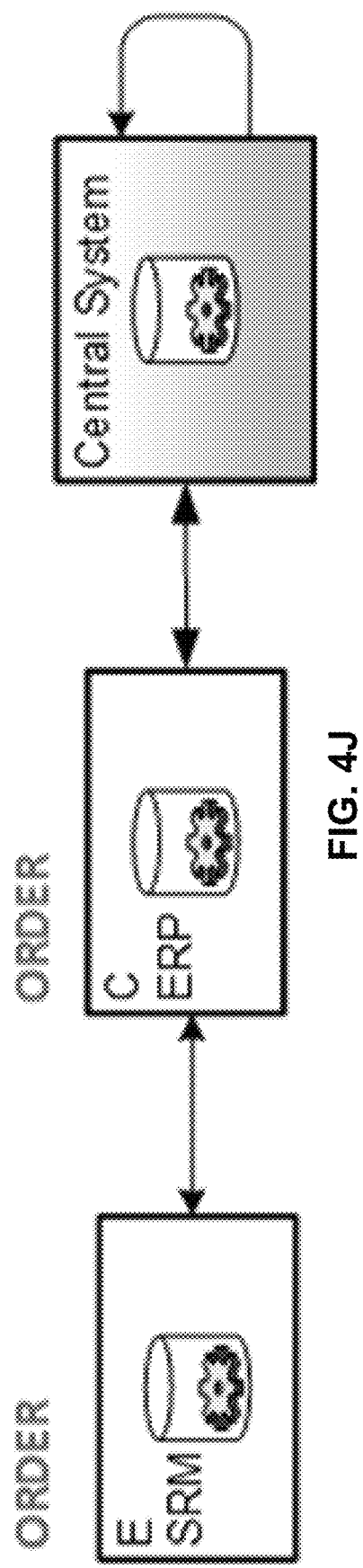

The UI may thus limit the view to the Central System as well as systems having a specific purpose assigned. Such a limited view of systems is shown in FIG. 4J.

The assignment of purpose information to table clusters is now discussed. After the "Order" purpose has been assigned to various systems, data related to this purpose (which shall be reported on), is to be defined for these systems.

A baseline data model reflecting table clusters for its applications may be provided, with customers allowed to enhance that data model. Table cluster naming should be done to promote customer understanding of the use case: e.g., that it contains address data, customer master data, is used for "Shipping" or for "Material Management".

Table clusters may not be local on a specific system, but may instead be linked to other systems. The Central System will have a link from the customer master (the customer number—as this is the trigger criteria defining the data subject's requesting personal data) to at least one table cluster in any directly attached system.

Figure 4K:
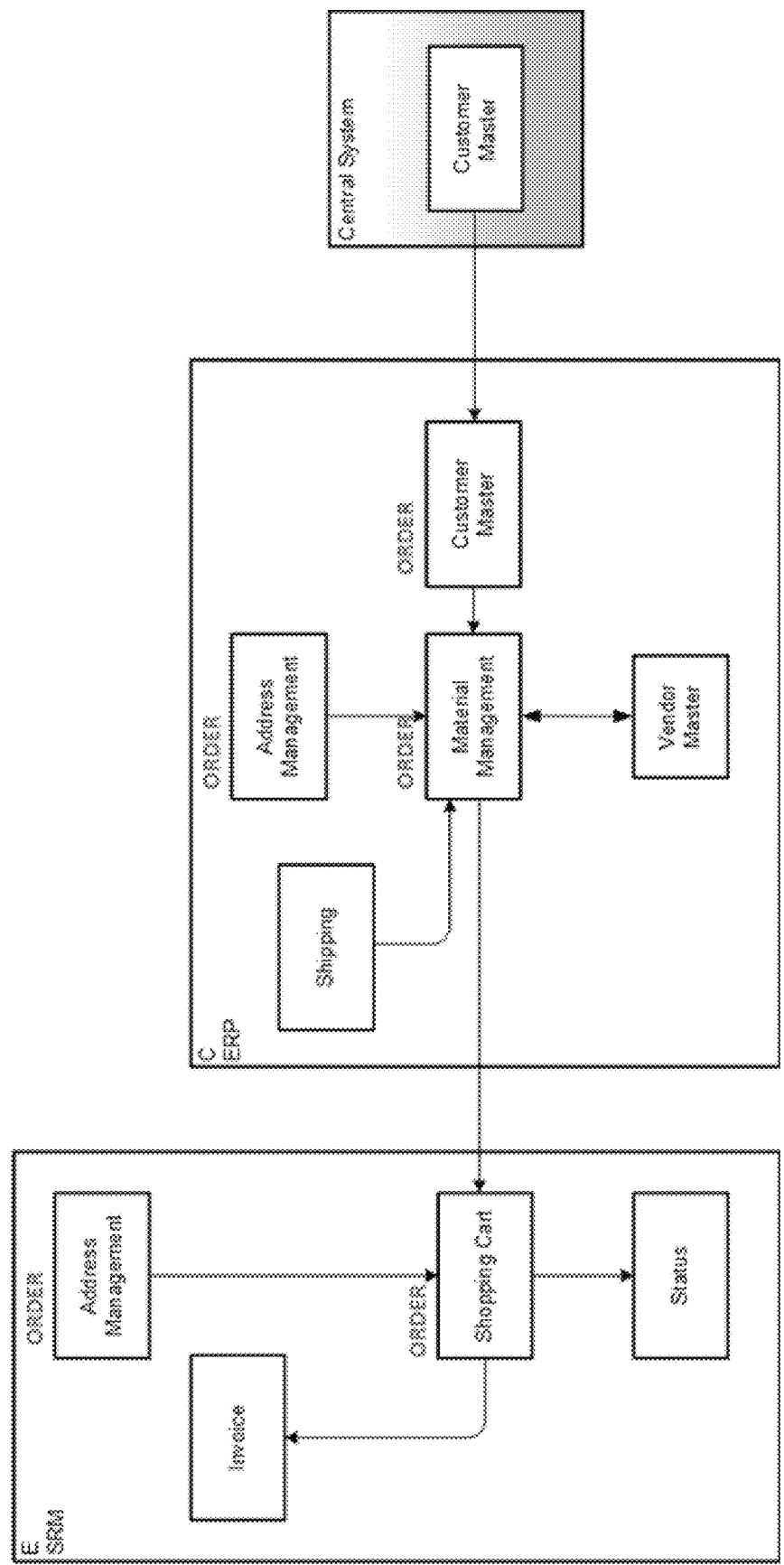

Using the UI of the systems, the customer can then view the table clusters within that ERP system as well as the directly attached SRM system, and assign those containing data related to the purpose. The customer may decide that only two table clusters in SRM and three in ERP are required. FIG. 4K shows the result of this, and also shows the linking Table Cluster between the central system to the ERP and from there to the SRM system.

Certain embodiments may include additional features. For example, there may be an ability to "copy" existing purpose definition of table clusters to another purpose, or to compare different purposes.

In some embodiments the customer may be able to manipulate the links between the table clusters, if data for the specific purpose can only be retrieved in a different manner.

If a customer has its own tables, then the customer may extend a table cluster internally or create a new table cluster. This may call for changes to the linked table cluster (specifying which field of a table should be used to access the new table cluster).

Once the purpose on the ERP system has been defined, the definition can be applied to other ERP systems automatically to ease the process for customers. Internal validity checks may be conducted on each system—for example to verify if the defined tables and fields exist.

Assignment of purpose information to fields, is now discussed. The customer may choose the fields from each table within a Table Cluster (TC) to be reported on. This can be done by selecting the purpose, and then selecting one of the TC's which are shown for a system in the UI.

A UI can allow maintaining all fields within the Table Cluster within one UI. For a customer it may not be relevant to know in exactly which tables data is stored. This is because a table cluster defines tables that belong to each other and are linked. Thus, specification of fields can be done per table cluster to ease the process for the customer.

Fields containing irrelevant entries (for example a unique identifier in hex-format is neither intelligible nor does it have any meaning) can be removed by default. However, such a filter can be turned off by the customer.

Additionally, customers can choose not to show fields of tables which are empty (not in use) on the customer's system.

It is possible to create a conversion code which is called when a specific field of a table is processed. This allows outputting the text "Ordered by mistake" or "Found a better offer" instead of the value stored, "M" or "F", allowing the creation of intelligible output even for values otherwise not understandable.

FIG. 4L shows an example of a UI indicating selection of relevant fields for the table cluster "Order". The fields shown are an excerpt. The "Output" of a field for the requestor can be "Yes", "No" or "Undefined".

Table clusters can be manipulated. Customers can change table clusters or create new ones, as has been described above.

In the specific example just described, the data model is created by evaluating Information Lifecycle Management (ILM) objects and their associated archiving objects. However, this application specific approach is not required in all embodiments, and alternative embodiments could perform this process on the data stored within a database.

Once created, the data model may be evaluated, enhanced, and/or corrected by a user. This may be done using a UI allowing easy modification of the underlying data model.

A customer defines on a central system with a UI, all express purposes that a company has. In certain applications these purposes may be related to data privacy/personal data, but this is not required.

Utilizing that same UI, the purposes are defined for each system within the company. In the above example, one system (e.g., an ERP system), has one or more applications running on it.

The data model is used as a starting point. An analysis of the model is done using the same the UI on the central system, collecting the data model via RFC from each system being defined. Selectable ILM object descriptions may provide an initial idea where specific data is possibly stored.

The previously defined purposes (purpose information) are now mapped to fields of tables. Links between tables may be altered (uni-/bi-directional), field descriptions may need to be changed, and field values may be rendered with intelligible text per purpose.

Links between data across systems may need to be defined. This can allow, e.g., the creation of follow-on documents in a different system/application.

This approach allows automated retrieval of data of a data subject for a variety of purposes from across a plurality of interconnected systems of a landscape, in intelligible form.

Embodiments of data information frameworks may be useful for addressing a variety of issues that can arise in the storage and retrieval of information (including personal information) within a data warehouse of an entity. For example the data information framework explicitly defines (utilizing specific fields), that particular information which is to be considered as personal data.

The data information framework also serves to identify with particularity, where such personal data is stored. That location information can include a data archive as well as an active database component.

The data information framework can also allow data collection efforts to be performed in such a manner that the result is intelligible. This can involve determining how database tables are linked, and how the data from each table is to be interpreted.

Embodiments may also provide detailed location information reflecting a potential complexity of the data warehouse. Thus if the data is present in an archive or file rather than in a database, that data may be collected and interpreted as well.

Embodiments further provide for data to be collected and interpreted for different purposes of the undergoing data processing and/or storage. That is, the purpose indicator explicitly identifies a reason for the data storage/processing, which can be quite detailed and varied in larger entities.

While the above describes embodiments useful for storing and collecting personal data, other applications are possible as well. For example, imposition of a "Legal Hold" may require an entity to prevent deletion of data related to a lawsuit, and also may require the identification of data related to the lawsuit. Data information frameworks allow these processes to take place in a relatively uninvasive manner, executed from a central location.

It is further noted that some nations may require data related to their citizens, to be physically stored within the country itself. Such restrictions can have ramifications in the context of cloud-based scenarios, where data is stored and processed anywhere around the globe (not necessarily limited to the jurisdiction in which an individual is a citizen). By imparting an ability to track and record such information about a citizen, embodiments of data information frameworks may mitigate these issues.

Returning to FIG. 1, while that figure shows the engine as separate from the database layer, this is not required. In certain embodiments, the engine may be implemented by a database engine, such as an in-memory database engine.

Figure 5:
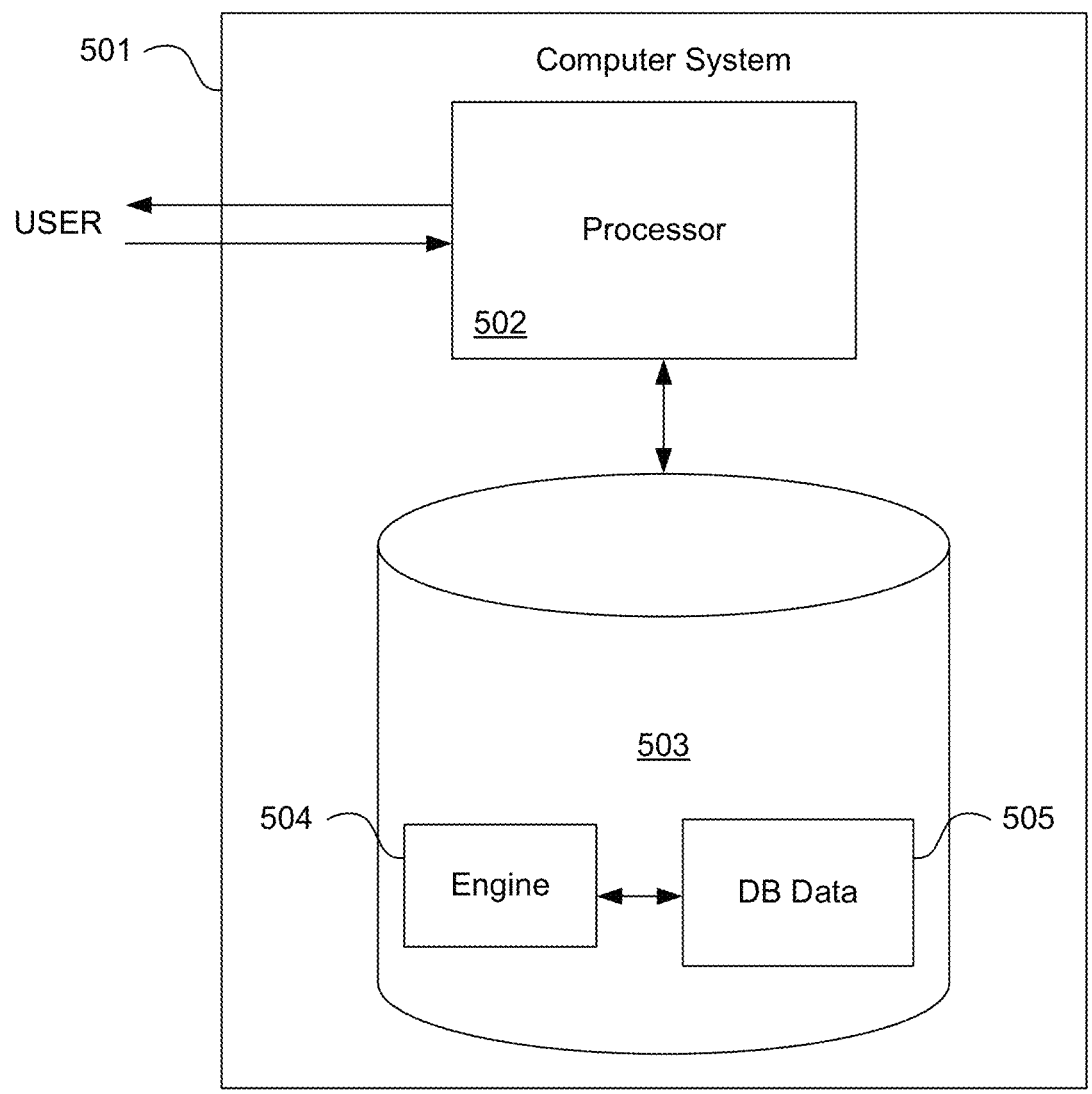
FIG. 5 illustrates hardware of a special purpose computing machine configured to provide a data information framework according to an embodiment.

For example, FIG. 5 illustrates hardware of a special purpose computing machine configured to provide a data information framework according to an embodiment. In particular, computer system 501 comprises a processor 502 that is in electronic communication with a non-transitory computer-readable storage medium 503. This computer-readable storage medium has stored thereon database data 505. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the engine may be implemented in other ways, for example as part of an overlying application layer.

Figure 6:
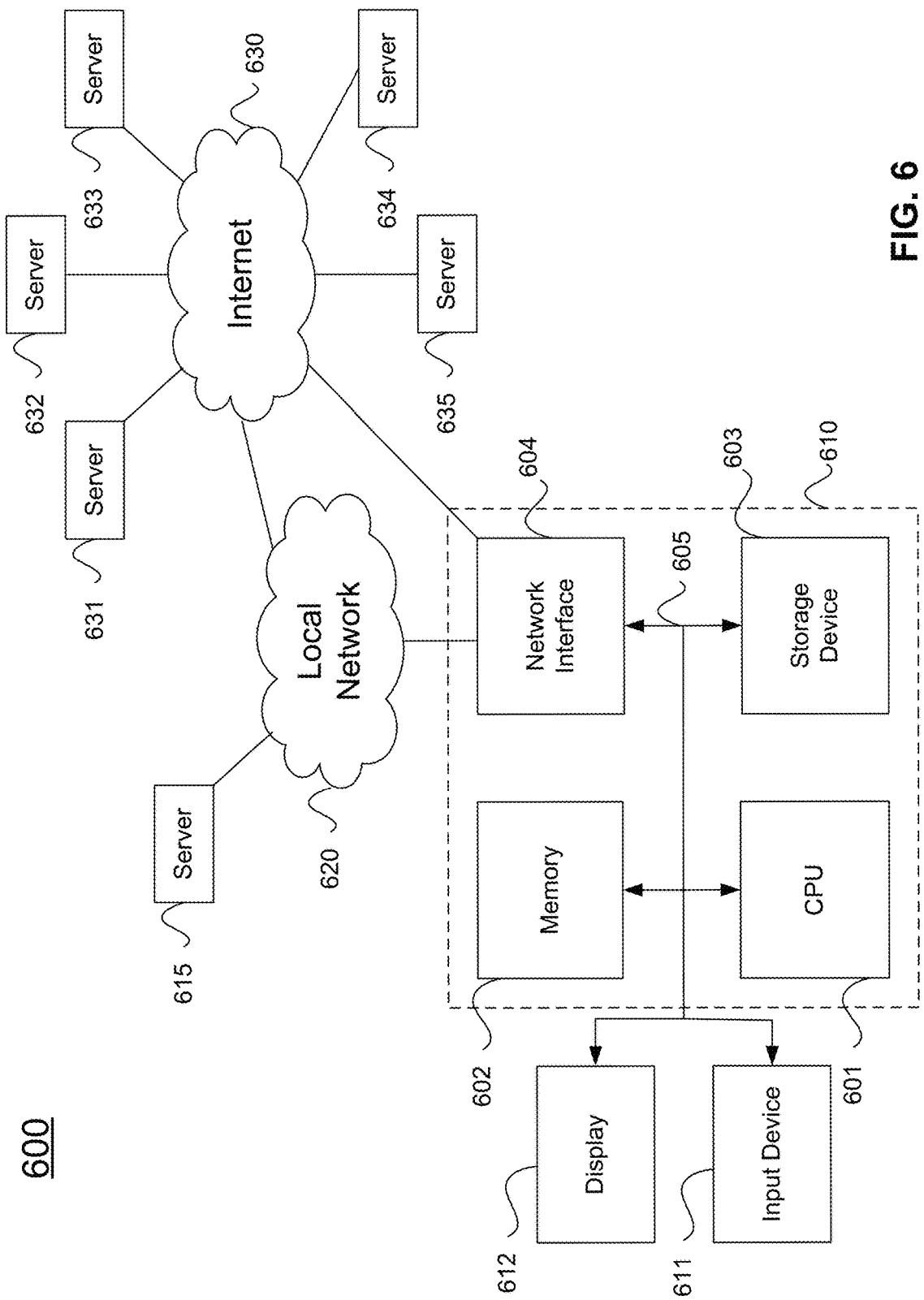
FIG. 6 illustrates an example computer system.

An example computer system landscape 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network, which may also be in different geographic locations. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   an engine communicating with a database containing a plurality of tables;
   the engine referencing a first table field to create a data model including links between certain of the plurality of tables comprising a first table and a second table, wherein the first table and the second table are part of a first system;
   the engine determining a second link between the first table and a third table of a second system, the second link defined by a remote function call;
   the engine grouping the certain of the plurality of tables into a plurality of table clusters based upon the links;
   the engine selectively assigning purpose information relevant to a regulation, to fewer than the plurality of table clusters including the first table field to create a purpose model;
   the engine receiving a query relating to the purpose information;
   the engine generating a query response by recursively traversing the certain of the plurality of tables to match the purpose information; and
   the engine delivering the query response for display at an interface comprising a hierarchical XML file.

2. A method as in claim 1 wherein the engine generates the query response by referencing the purpose information to render the first table field into a text description.

3. A method as in claim 1 wherein the links are defined by the certain of the plurality of tables belonging to a database object type.

4. A method as in claim 1 wherein the purpose information denotes private data.

5. A method as in claim 1 wherein the database comprises an in-memory database.

6. A method as in claim 1 wherein the engine comprises an in-memory database engine.

7. A computer-implemented method comprising:
   an engine communicating with a database containing a plurality of tables;
   the engine referencing a first table field to create a data model including links between certain of the plurality of tables comprising a first table and a second table that are part of a first system;
   the engine determining a second link between the first table and a third table of a second system;
   the engine grouping the certain of the plurality of tables into a plurality of table clusters based upon the links;
   the engine selectively assigning purpose information relevant to a regulation, to fewer than the plurality of table clusters including the first table field to create a purpose model;
   the engine receiving a query relating to the purpose information;
   the engine generating a query response by recursively traversing the certain of the plurality of tables to match the purpose information, and referencing the purpose information to render the first table field into a text description; and
   the engine delivering the query response for display at an interface comprising a hierarchical XML file.

8. A method as in claim 7 wherein the second link is defined by a remote function call.

9. A method as in claim 7 wherein the links are defined by the certain of the plurality of tables belonging to a database object type.

10. A method as in claim 7 further comprising the engine storing the purpose information in an in-memory database, wherein the engine comprises an in-memory database engine.

11. A method as in claim 10 wherein the engine creates a helper table in the in-memory database to store the purpose information, and creates a link to the helper table.

12. A computer system comprising:
    a processor;
    an in-memory database engine; and
    a software program, executable on said computer system, the software program configured to cause the in-memory database engine to:
    communicate with an in-memory database containing a plurality of tables;
    reference a first table field to create a data model including links between certain of the plurality of tables comprising a first table and a second table, wherein the first table and the second table are part of a first system;
    determine a second link between the first table and a third table of a second system, the second link defined by a remote function call;
    group the certain of the plurality of tables into a plurality of table clusters based upon the links;
    selectively assign purpose information relevant to a regulation, to fewer than the plurality of table clusters including the first table field to create a purpose model;
    receive a query relating to the purpose information;
    generate a query response by recursively traversing the certain of the plurality of tables to match the purpose information; and
    deliver the query response for display at an interface comprising a hierarchical XML file.

13. A computer system as in claim 12 wherein the software program is further configured to cause the in-memory database engine to generate the query response by referencing the purpose information to render the first table field into a text description.

14. A computer system as in claim 12 wherein the links are defined by the certain of the plurality of tables belonging to a database object type.

* * * * *